(12) United States Patent
Chau et al.

(10) Patent No.: US 11,408,273 B2
(45) Date of Patent: Aug. 9, 2022

(54) ADVANCED INGROUND OPERATIONS, SYSTEM AND ASSOCIATED APPARATUS

(71) Applicant: Merlin Technology, Inc., Kent, WA (US)

(72) Inventors: Albert W. Chau, Woodinville, WA (US); Benjamin John Medeiros, Coeur d'Alene, ID (US); Craig Caswell, McKinney, TX (US)

(73) Assignee: Merlin Technology, Inc., Kent, WA (US)

( * ) Notice: Subject to any disclaimer, the term of this patent is extended or adjusted under 35 U.S.C. 154(b) by 1 day.

(21) Appl. No.: 16/918,355

(22) Filed: Jul. 1, 2020

(65) Prior Publication Data

US 2020/0332646 A1 Oct. 22, 2020

Related U.S. Application Data

(62) Division of application No. 15/581,135, filed on Apr. 28, 2017, now Pat. No. 10,738,592, which is a
(Continued)

(51) Int. Cl.
*E21B 47/024* (2006.01)
*E21B 44/00* (2006.01)
(Continued)

(52) U.S. Cl.
CPC ............ *E21B 47/024* (2013.01); *E21B 7/046* (2013.01); *E21B 21/08* (2013.01); *E21B 44/00* (2013.01);
(Continued)

(58) Field of Classification Search
CPC ........ E21B 47/024; E21B 7/046; E21B 21/08; E21B 44/00; E21B 47/02; E21B 47/06;
(Continued)

(56) References Cited

U.S. PATENT DOCUMENTS 3,908,453 A * 9/1975 Jeter ....................... E21B 47/20
73/152.54
RE31,222 E * 4/1983 McCracken ............. G01D 9/16
702/6
(Continued)

FOREIGN PATENT DOCUMENTS

RU 2100531 C1 12/1997
RU 2175368 C2 10/2001
(Continued)

OTHER PUBLICATIONS

The International Search Report and The Written Opinion of the International Searching Authority for International Application No. PCT/US 2013/051406 which is associated with U.S. Appl. No. 13/946,284, dated Nov. 28, 2013, Moscow, Russia.
(Continued)

*Primary Examiner* — Steven A MacDonald
(74) *Attorney, Agent, or Firm* — Pritzkau Patent Group LLC

(57) ABSTRACT

Systems, apparatus and methods are described for purposes of initiating a response to detection of an adverse operational condition involving a system including a drill rig and an inground tool. The response can be based on an uphole sensed parameter in combination with a downhole sensed parameter. The adverse operational condition can involve cross-bore detection, frac-out detection, excessive downhole pressure, a plugged jet indication and drill string key-holing detection. A communication system includes an inground communication link that allows bidirectional communication between a walkover detector and the drill rig via the inground tool. Monitoring of inground tool depth and/or lateral movement can be performed using techniques that approach integrated values. Bit force based auto-carving is described in the context of an automated procedure.

15 Claims, 23 Drawing Sheets

Related U.S. Application Data division of application No. 13/946,284, filed on Jul. 19, 2013, now Pat. No. 9,664,027.

(60) Provisional application No. 61/674,248, filed on Jul. 20, 2012.

(51) Int. Cl.

| | |
|---|---|
| *E21B 7/04* | (2006.01) |
| *E21B 47/06* | (2012.01) |
| *E21B 47/02* | (2006.01) |
| *E21B 47/10* | (2012.01) |
| *E21B 21/08* | (2006.01) |
| *E21B 47/13* | (2012.01) |
| *E21B 47/12* | (2012.01) |
| *G01V 3/18* | (2006.01) |

(52) U.S. Cl.
CPC ............. *E21B 47/02* (2013.01); *E21B 47/06* (2013.01); *E21B 47/10* (2013.01); *E21B 47/12* (2013.01); *E21B 47/13* (2020.05); *G01V 3/18* (2013.01)

(58) Field of Classification Search
CPC .......... E21B 47/10; E21B 47/12; E21B 47/13; E21B 7/10; E21B 7/28; E21B 44/02; G01V 3/18
See application file for complete search history.

(56) References Cited

U.S. PATENT DOCUMENTS

| | | | | |
|---|---|---|---|---|
| 4,468,760 | A * | 8/1984 | Zalesak | G01V 13/00 367/13 |
| 4,578,675 | A | 3/1986 | MacLeod | |
| 4,709,357 | A * | 11/1987 | Maki, Jr. | E21B 47/005 367/35 |
| 4,787,093 | A * | 11/1988 | Rorden | E21B 47/12 340/855.4 |
| 4,909,336 | A * | 3/1990 | Brown | E21B 7/068 175/45 |
| 5,361,029 | A | 11/1994 | Rider et al. | |
| 5,457,995 | A | 10/1995 | Staton et al. | |
| 5,490,121 | A * | 2/1996 | Gardner | E21B 47/18 340/853.1 |
| 5,513,710 | A * | 5/1996 | Kuckes | E21B 47/0232 175/45 |
| 5,698,981 | A * | 12/1997 | Mercer | G01V 3/26 324/329 |
| 5,764,062 | A * | 6/1998 | Mercer | G01V 3/165 324/329 |
| 5,961,252 | A | 10/1999 | Mercer et al. | |
| 6,035,951 | A * | 3/2000 | Mercer | E21B 47/0232 175/45 |
| 6,044,396 | A * | 3/2000 | Adams | H04N 19/115 725/95 |
| 6,047,783 | A * | 4/2000 | Mercer | E21B 47/0232 175/45 |
| 6,102,136 | A | 8/2000 | Archambeault et al. | |
| 6,160,401 | A * | 12/2000 | Mercer | E21B 47/0232 324/326 |
| 6,223,826 | B1 * | 5/2001 | Chau | H01R 13/533 166/380 |
| 6,285,190 | B1 | 9/2001 | Brune et al. | |
| 6,308,787 | B1 * | 10/2001 | Alft | E21B 7/265 175/48 |
| 6,315,062 | B1 | 11/2001 | Alft et al. | |
| 6,408,952 | B1 | 6/2002 | Brand et al. | |
| 6,417,666 | B1 * | 7/2002 | Mercer | E21B 47/0228 324/326 |
| 6,466,020 | B2 * | 10/2002 | Kuckes | G01V 3/30 324/326 |
| 6,496,008 | B1 | 12/2002 | Brune et al. | |
| 6,614,354 | B2 | 9/2003 | Haines et al. | |
| 6,651,755 | B1 * | 11/2003 | Kelpe | E21B 44/00 175/26 |
| 6,679,120 | B1 | 1/2004 | Cribbs et al. | |
| 6,682,264 | B1 | 1/2004 | McGillis | |
| 6,719,069 | B2 | 4/2004 | Alft et al. | |
| 6,868,921 | B2 * | 3/2005 | Burrows | E21B 7/04 175/26 |
| 6,899,178 | B2 | 5/2005 | Tubel | |
| 6,904,981 | B2 | 6/2005 | Van Riet | |
| 6,910,541 | B2 | 6/2005 | Kelpe | |
| 7,000,710 | B1 * | 2/2006 | Umbach | E21B 7/046 175/45 |
| 7,064,676 | B2 | 6/2006 | Hall et al. | |
| 7,425,829 | B2 | 9/2008 | Zeller et al. | |
| 7,607,494 | B2 | 10/2009 | Alft et al. | |
| 7,737,863 | B2 | 6/2010 | Jin et al. | |
| 7,775,301 | B2 * | 8/2010 | Brune | E21B 47/0228 175/61 |
| 7,967,080 | B2 * | 6/2011 | Burrows | E21B 7/04 175/24 |
| 8,044,821 | B2 * | 10/2011 | Mehta | E21B 47/12 340/855.7 |
| 8,220,564 | B2 * | 7/2012 | Runquist | E21B 7/046 175/61 |
| 8,381,836 | B2 | 2/2013 | Brune et al. | |
| 8,841,923 | B1 * | 9/2014 | Vanwiggeren | G01R 27/32 324/606 |
| 9,976,410 | B2 * | 5/2018 | Mizunaga | E21B 47/092 |
| 10,107,090 | B2 * | 10/2018 | Brune | E21B 47/024 |
| 2001/0024597 | A1 | 9/2001 | Turner et al. | |
| 2002/0000316 | A1 * | 1/2002 | Haase | E21B 47/06 166/244.1 |
| 2002/0020561 | A1 | 2/2002 | Alft et al. | |
| 2002/0105331 | A1 | 8/2002 | Brune et al. | |
| 2003/0056381 | A1 * | 3/2003 | Brosnahan | E21B 47/022 33/313 |
| 2003/0111268 | A1 | 6/2003 | Alft et al. | |
| 2004/0028476 | A1 * | 2/2004 | Payne | E21B 44/00 405/184 |
| 2004/0118612 | A1 * | 6/2004 | Haci | E21B 44/00 175/61 |
| 2004/0155794 | A1 * | 8/2004 | Gardner | G01V 11/002 340/855.7 |
| 2004/0163822 | A1 | 8/2004 | Zhang et al. | |
| 2004/0222023 | A1 * | 11/2004 | Haci | E21B 7/068 175/61 |
| 2004/0222901 | A1 * | 11/2004 | Dodge | G01V 11/002 340/854.3 |
| 2005/0082091 | A1 | 4/2005 | Kingsley | |
| 2005/0182870 | A1 * | 8/2005 | Steiner | E21B 47/12 710/60 |
| 2005/0199424 | A1 * | 9/2005 | Stump | G01S 13/86 175/45 |
| 2005/0285753 | A1 | 12/2005 | Shah et al. | |
| 2007/0007006 | A1 | 1/2007 | Massingill | |
| 2007/0029112 | A1 | 2/2007 | Li et al. | |
| 2007/0061093 | A1 * | 3/2007 | Angelescu | G01F 1/704 702/100 |
| 2007/0177461 | A1 * | 8/2007 | Marsh | E21B 47/20 367/81 |
| 2007/0199721 | A1 * | 8/2007 | Givens | G06Q 10/06312 166/382 |
| 2008/0262737 | A1 * | 10/2008 | Thigpen | E21B 43/14 702/9 |
| 2008/0285386 | A1 | 11/2008 | Sinanovic | |
| 2009/0078467 | A1 * | 3/2009 | Castillo | E21B 25/10 175/249 |
| 2009/0182472 | A1 * | 7/2009 | Singh | E21B 47/12 701/50 |
| 2009/0236146 | A1 * | 9/2009 | Pierz | E21B 7/20 175/62 |
| 2009/0287451 | A1 * | 11/2009 | Sato | G01C 19/42 702/153 |
| 2010/0071910 | A1 * | 3/2010 | Ellson | E21B 41/0085 166/385 |
| 2010/0224356 | A1 | 9/2010 | Moore | |

(56) References Cited

U.S. PATENT DOCUMENTS

| | | | |
|---|---|---|---|
| 2010/0224411 A1* | 9/2010 | Burrows | E21B 47/024 175/45 |
| 2010/0236777 A1* | 9/2010 | Partouche | E21B 17/206 166/254.2 |
| 2010/0300685 A1* | 12/2010 | Del Campo | E21B 17/003 166/254.2 |
| 2012/0170410 A1* | 7/2012 | Hay | E21B 47/16 367/82 |
| 2012/0217023 A1* | 8/2012 | Chau | E21B 7/046 166/380 |
| 2012/0241218 A1 | 9/2012 | Chau et al. | |
| 2013/0138508 A1 | 5/2013 | Gee | |
| 2013/0176137 A1* | 7/2013 | Kolpack | E21B 47/01 340/854.3 |
| 2013/0176139 A1 | 7/2013 | Chau et al. | |
| 2014/0064410 A1* | 3/2014 | Swarup | H04L 27/001 375/300 |
| 2014/0375464 A1 | 12/2014 | Caragata | |
| 2015/0145687 A1* | 5/2015 | Roberts | E21B 47/13 340/853.2 |
| 2016/0251956 A1* | 9/2016 | Parra | E21B 47/13 340/854.9 |
| 2017/0019673 A1* | 1/2017 | Tsukuba | H04N 19/46 |
| 2018/0292513 A1* | 10/2018 | Bidner | G01S 17/58 |

FOREIGN PATENT DOCUMENTS

| | | |
|---|---|---|
| RU | 2004127944 | 5/2005 |
| WO | 8801012 A1 | 2/1988 |
| WO | 0042287 A1 | 7/2000 |
| WO | 2000/060777 A1 | 10/2000 |
| WO | 01/51760 A2 | 7/2001 |

OTHER PUBLICATIONS

George McGuire, Locating While Backreaming, Nov. 2000, Trenchless Technology.
Official Action of Substantive Examination for Application No. 2014126338 which is associated with International Application No. PCT/US2013/020359 which is associated with U.S. Appl. No. 13/733,097, Federal Institute of Industrial Property, dated Jun. 24, 2015, Moscow, Russia.
The International Search Report and The Written Opinion of the International Searching Authority for International Application No. PCT/US2013/020359 which is associated with U.S. Appl. No. 13/733,097, dated Apr. 18, 2013, Moscow, Russia.
The International Preliminary Report on Patentability for International Application No. PCT/US2013/020359 which is associated with U.S. Appl. No. 13/733,097, dated Jul. 8, 2014, Geneva, Switzerland.
Extended European Search Report for European Application No. 13733871.1 which is associated with International Application No. PCT/US2013/020359 which is associated with U.S. Appl. No. 13/733,097, dated May 18, 2016, Munich, Germany.
The First Office Action of The State Intellectual Property Office of People's Republic of China for Chinese Application No. 201310001524.8 which is associated with International Application No. PCT/US2013/020359 which is associated with U.S. Appl. No. 13/733,097, dated Sep. 24, 2015. (machine translation included).
The Second Office Action of The State Intellectual Property Office of People's Republic of China for Chinese Application No. 201310001524.8 which is associated with International Application No. PCT/US2013/020359 which is associated with U.S. Appl. No. 13/733,097, dated Jun. 29, 2016. (machine translation included).
Extended European Search Report for European Application No. 13819757.9 which is associated with International Application No. PCT/US2013/051406 which is associated with U.S. Appl. No. 13/946,284, dated Jun. 27, 2016, Munich, Germany.
Empire Generating Co, "Horizontal Directional Drill Contingency Plan", Aug. 28, 2008, pp. 1-17, XP055281407, Retrieved from the Internet: URL:http://documents.dps.ny.gov/public/Common/ViewDoc.aspx?DocRefId={84EDDA33-069A-4446-A5FE-12D5271926D5} [retrieved on Jun. 17, 2016].
The Third Office Action of The State Intellectual Property Office of People's Republic of China for Chinese Application No. 201310001524.8 which is associated with International Application No. PCT/US2013/020359 which is associated with U.S. Appl. No. 13/733,097, dated Dec. 30, 2016.
The First Office Action of The State Intellectual Property Office of People's Republic of China for Chinese Application No. 201380042466.1 which is associated with International Application No. PCT/US2013/051406 which is associated with U.S. Appl. No. 13/946,284, dated Mar. 13, 2017. (machine translation included).
Communication pursuant to Article 94(3) EPC for European Application No. 13733871.1 which is associated with International Application No. PCT/US2013/020359 which is associated with U.S. Appl. No. 13/733,097, dated Feb. 24, 2017, Netherlands.
The Fourth Office Action of The State Intellectual Property Office of People's Republic of China for Chinese Application No. 201310001524.8 which is associated with International Application No. PCT/US2013/020359 which is associated with U.S. Appl. No. 13/733,097, dated Jul. 12, 2017. (machine translation included).
Communication Pursuant to Article 94(3) EPC for Application No. 13733871.1 which is associated with International Application No. PCT/US2013/020359 which is associated with U.S. Appl. No. 13/733,097, dated Jan. 26, 2018, European Patent Office, Netherlands.
Sun, Zai, Research and Application of Pressure Measurement While Drilling, Xian Shiyou University, Xian, China, Sep. 2011 with machine translation.
The First Office Action of the Peoples Republic of China for Chinese Application No. 201810329554.4, which is associated with International Application No. PCT/US 2013/051406 which is associated with U.S. Appl. No. 13/946,284, dated Feb. 22, 2021, Beijing, China with Global Dossier translation.
Yang, Minqing, M3 Well Leakage Cause Analysis and Mud Logging Monitoring Prevention Methods, China Sinopec Petroleum Engineering Research Institute, Beijing, China, Jul. 2011 with machine translation.

* cited by examiner

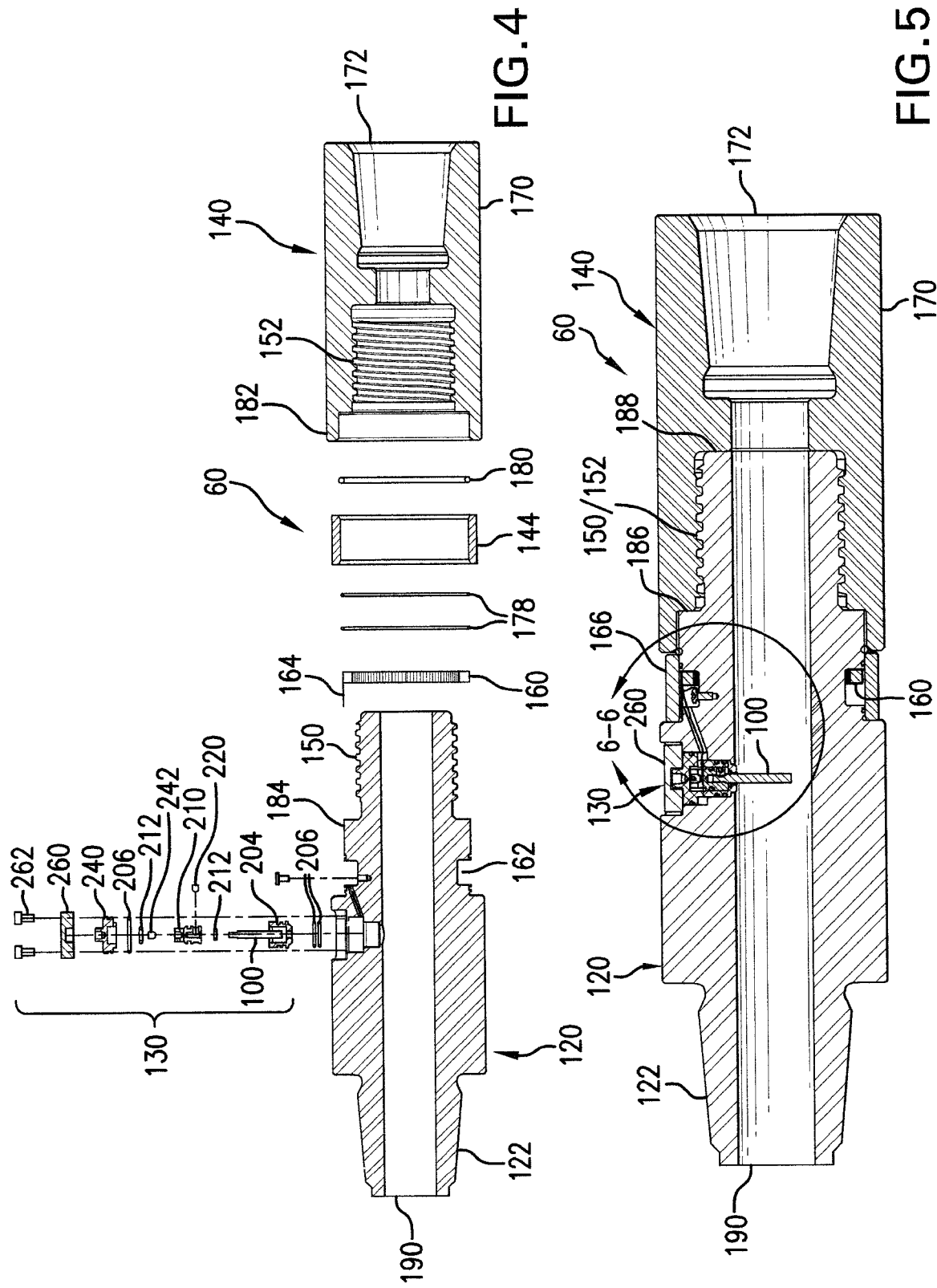

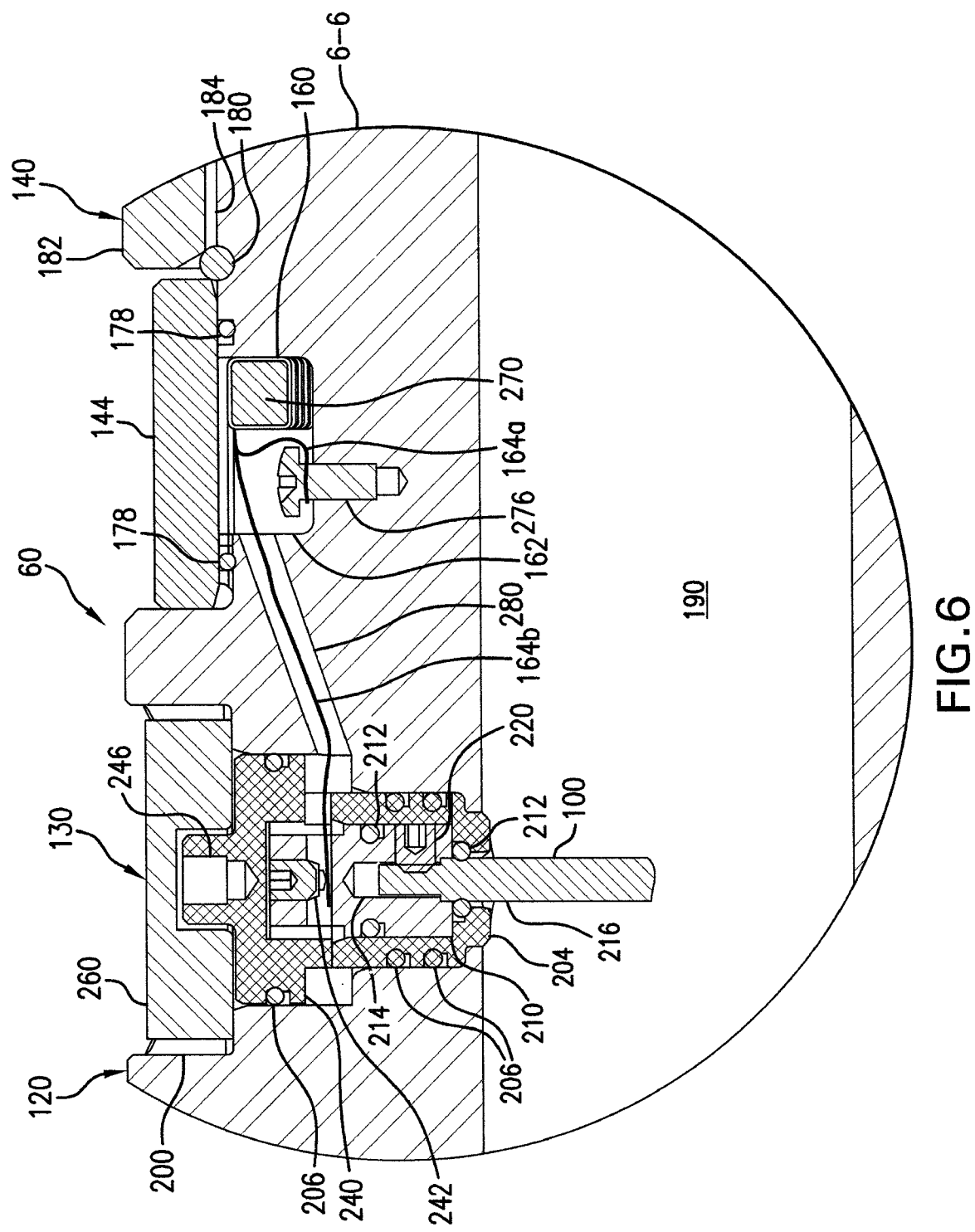

ADVANCED INGROUND OPERATIONS, SYSTEM AND ASSOCIATED APPARATUS

RELATED APPLICATION

This application is a divisional application of copending U.S. patent application Ser. No. 15/581,135 filed on Apr. 28, 2017; which is a divisional application of U.S. patent application Ser. No. 13/946,284 filed on Jul. 19, 2013 and issued as U.S. Pat. No. 9,664,027 on May 30, 2017; which claims priority from U.S. Provisional Patent Application Ser. No. 61/674,248 filed on Jul. 20, 2012; the disclosures of which are incorporated herein by reference in their entirety.

BACKGROUND

The present application is generally related to inground operations and, more particularly, to advanced systems, apparatus and methods for performing such inground operations in ways that are heretofore unknown.

A technique that is often referred to as horizontal directional drilling (HDD) can be used for purposes of installing a utility without the need to dig a trench. A typical utility installation involves the use of a drill rig having a drill string that supports a boring tool at a distal or inground end of the drill string. The drill rig forces the boring tool through the ground by applying a thrust force to the drill string. The boring tool is steered during the extension of the drill string to form a pilot bore. Upon completion of the pilot bore, the distal end of the drill string is attached to a pullback apparatus which is, in turn, attached to a leading end of the utility. The pullback apparatus and utility are then pulled through the pilot bore via retraction of the drill string to complete the installation. In some cases, the pullback apparatus can comprise a back reaming tool which serves to expand the diameter of the pilot bore ahead of the utility so that the installed utility can be of a greater diameter than the original diameter of the pilot bore.

Such trenchless utility installation is generally well suited to developed areas as compared to the prior practice of digging a trench along the entirety of the installation pathway. HDD has also proven to be practical for installing utilities in locations where a trench cannot be formed such as, for example, under a river, under a building or below some other obstruction, man-made or otherwise. Unfortunately, there are some risks associated with trenchless utility installation. For example, there may be pre-existing utilities that cross an intended path of installation of the new utility. In some cases, the locations of pre-existing utilities are known, however, that is not always the case. Thus, there is a danger associated with inadvertently drilling into an unknown pre-existing utility. The prior art includes several approaches that attempt to deal with this problem, as will be described immediately hereinafter.

One approach is taught by U.S. Pat. No. 5,457,995 issued to Staton (hereinafter, the '995 patent). Staton attempts to use acoustical information in conjunction with seismic information in order to detect that a boring tool has encountered a pre-existing utility. Unfortunately, the technique requires prior knowledge of the pre-existing utility as well as physical access thereto. For at least these reasons, the technique is not applicable for purposes of detecting an encounter with an unknown pre-existing utility. It is noted that the patent briefly describes monitoring thrust force that is applied to the drill string for use in conjunction with acoustical and seismic information. In particular, the '995 patent describes monitoring hydraulic thrust force at the drill rig as assertedly being indicative of striking a utility based on an increase in the thrust force. At the same time, however, the '995 patent admits that there may be no increase in the thrust force, depending upon the material from which the utility is formed, and does not appear to offer any solution in this instance. Applicants further recognize, as will be described in detail hereinafter, that thrust force at the drill rig does not necessarily indicate the force that is being applied to the soil by a boring tool.

Another approach taken by the prior art is described by U.S. Pat. No. 6,614,354 (hereinafter, the '354 patent). This patent teaches a technique for detecting contact with an inground pipeline based on monitoring an acoustic sensor and an impressed current sensor. Unfortunately, like the '995 patent, prior knowledge of the existence of the pipeline as well as physical access are required in order to use the technique.

During an HDD operation, either for purposes of drilling the pilot bore and during pullback or back-reaming to install the utility, a drilling fluid or mud is typically transmitted through the drill string for emission from the inground end. During drilling, the mud can be emitted under such high pressure from the drill head that it assists in cutting through the soil and/or rock at the end face of the pilot bore. The mud can then flow in an opposite direction, back to the drill rig, in an annular region surrounding the boring tool and drill string while carrying cuttings back to the surface. The drilling mud can also serve in cooling the drill head and providing lubrication. During the pullback/back-reaming operation, drilling mud can be emitted from a leading surface of a reaming tool under high pressure, as the drill string is retracted, to assist in cutting through the soil and to provide lubrication for the utility that is being installed so as to reduce the tension on the utility. As in the drilling operation, the drilling fluid can also serve to carry cuttings in the uphole direction.

In view of the foregoing, another risk that is associated with trenchless utility installation involves what is often called a "frac-out." Rather than follow the uphole path that is defined by the pilot bore after emission from the inground tool, the pressurized mud can sometimes escape through a fracture in the ground. The escaped mud may damage roadways or other structures and may raise environmental concerns. As will be described in detail below, Applicants further recognize heretofore unseen methods and apparatus for purposes of frac-out detection. Still further benefits are described below in relation to the described techniques for frac-out and cross-bore detection. For example, certain operational conditions associated with the emission of the drilling mud from drill head jets can be detected.

Still another risk with respect to trenchless utility installation concerns what can be referred to as key-holing. The latter term describes the behavior of the utility in tending to straighten curves during the pullback operation. Applicants recognize that the result of key-holing can be an undesirable intersection between a new utility and a pre-existing utility or other inground obstacle. Applicants further recognize and describe below heretofore unseen methods and apparatus for purposes of detecting key-holing.

A number of other improvements are brought to light in the disclosure of the present application. For example, improvements are described relating to system communication and determination of the depth of the inground tool as well as an advanced steering technique that is applicable to inground conditions that traditionally result in difficulties with respect to steering the boring tool.

The foregoing examples of the related art and limitations related therewith are intended to be illustrative and not exclusive. Other limitations of the related art will become apparent to those of skill in the art upon a reading of the specification and a study of the drawings.

BRIEF DESCRIPTIONS OF THE DRAWINGS

Exemplary embodiments are illustrated in referenced figures of the drawings. It is intended that the embodiments and figures disclosed herein are to be illustrative rather than limiting.

FIG. 4 is a diagrammatic exploded view, in elevation and partial cross-section, of the embodiment of the coupling adapter of FIGS. 2 and 3, shown here to still further illustrate details of its structure.

FIG. 5 is a diagrammatic assembled view, in elevation and partial cross-section, of the embodiment of the coupling adapter of FIGS. 2-4, showing details with respect to its assembled configuration.

FIG. 6 is a further enlarged fragmentary view, in elevation and partial cross-section, taken within a circle 6-6 in FIG. 5, shown here to illustrate details with respect to electrical connections in the embodiment of FIG. 5 of the coupling adapter.

Figure 15A:
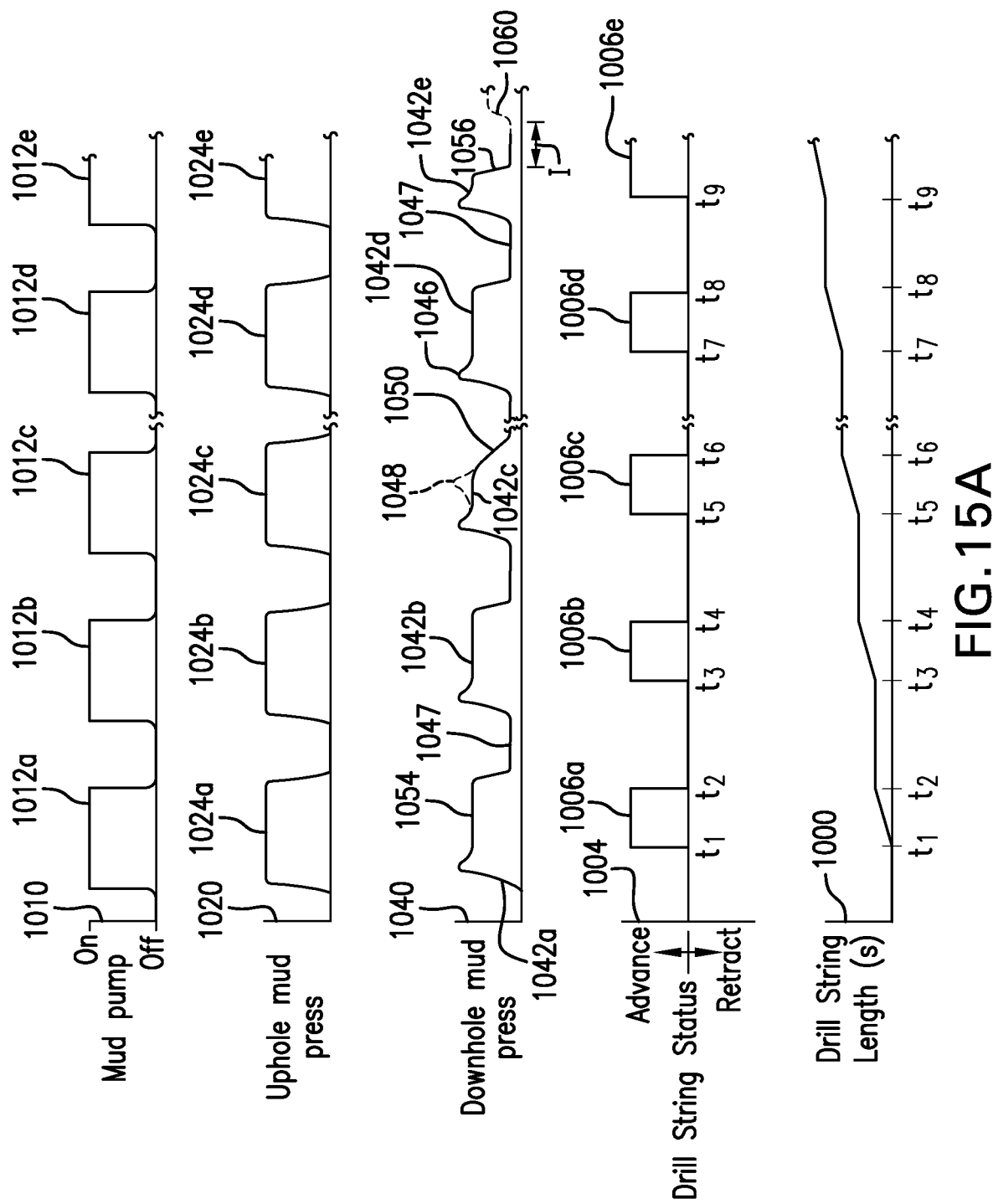

FIG. 15a includes a number of operational parameters plotted against time for purposes of illustrating various operational circumstances according to the present disclosure.

Figure 15B:
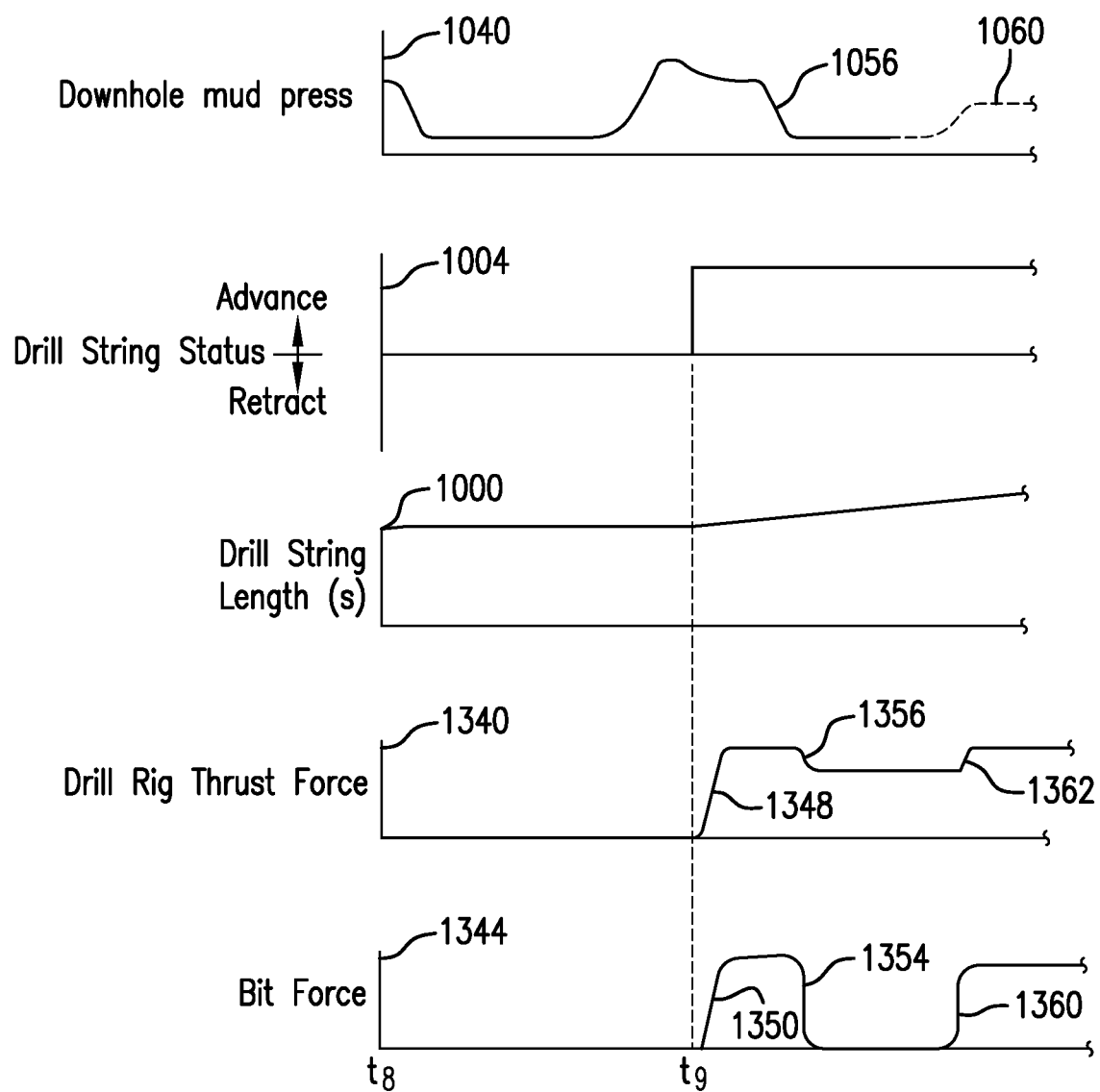

FIG. 15b is an enlarged plot based on a portion of the plot of FIG. 15a and further illustrating drill rig thrust force and bit force in time relation.

Figure 1:
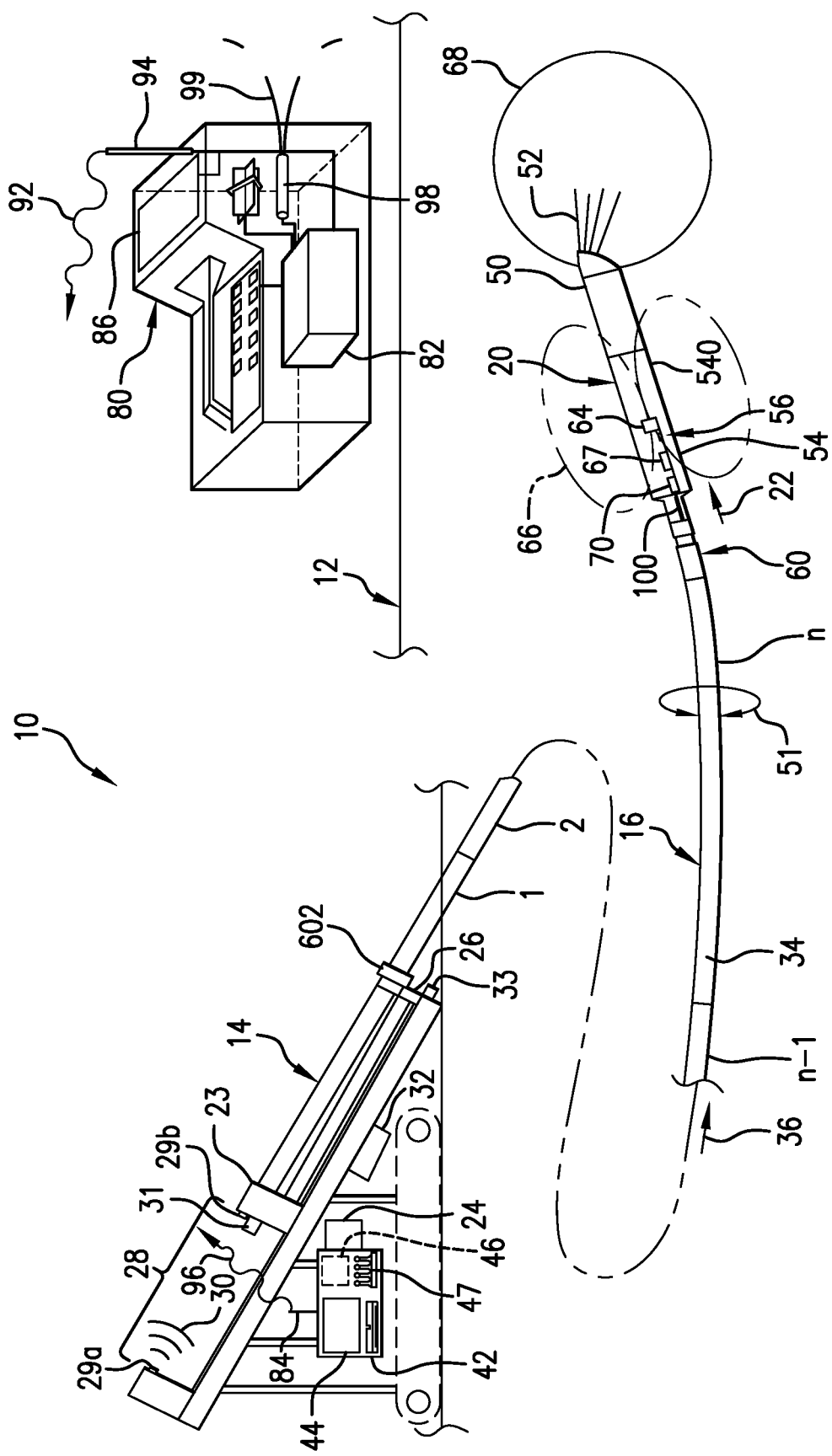
FIG. 1 is a diagrammatic view, in elevation, of a system which utilizes signal coupling through the drill string in the context of crossbore detection as well as for purposes of implementing other features of the present disclosure.
Figure 16:
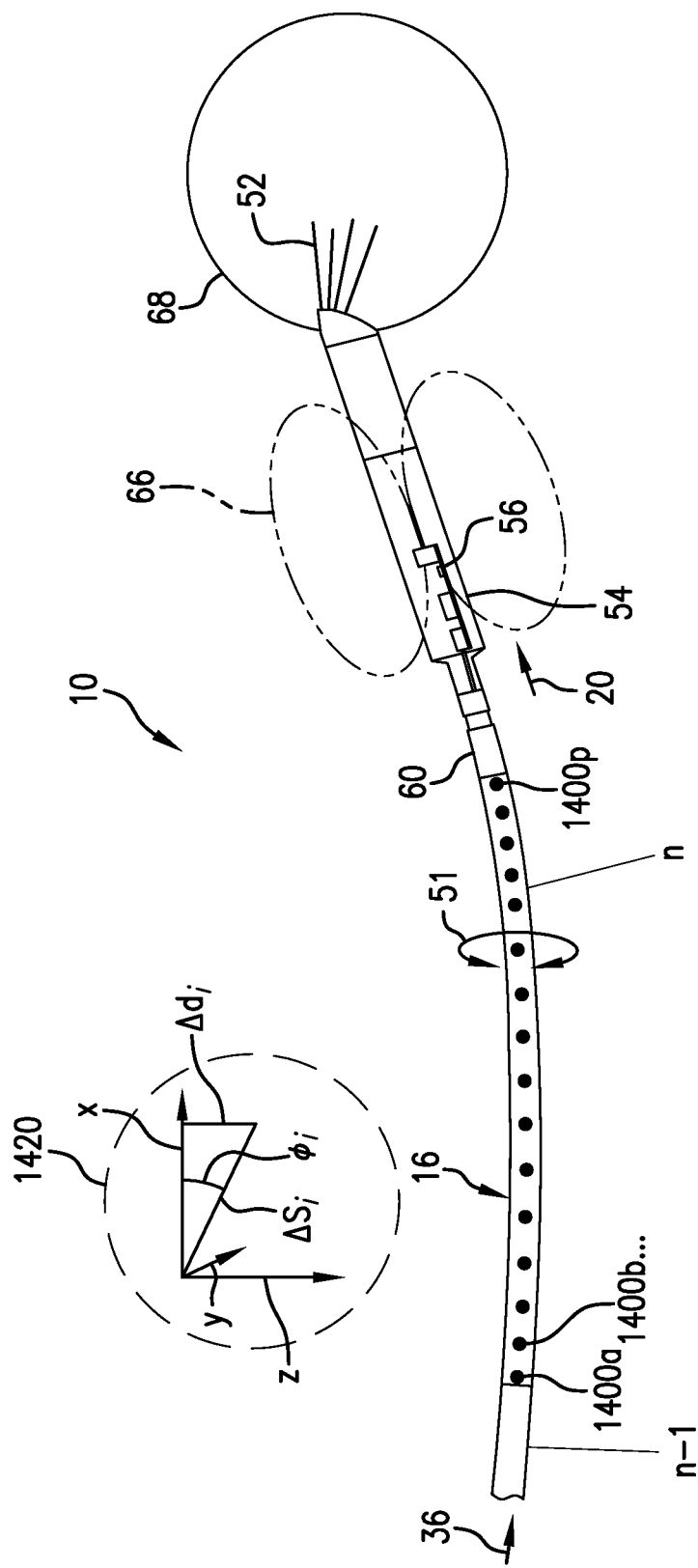

FIG. 16 is a further enlarged, diagrammatic illustration of an inground tool and distal end of the drill string of FIG. 1, shown here for purposes of describing details of an integrated depth technique in accordance with the present disclosure.

Figure 17:
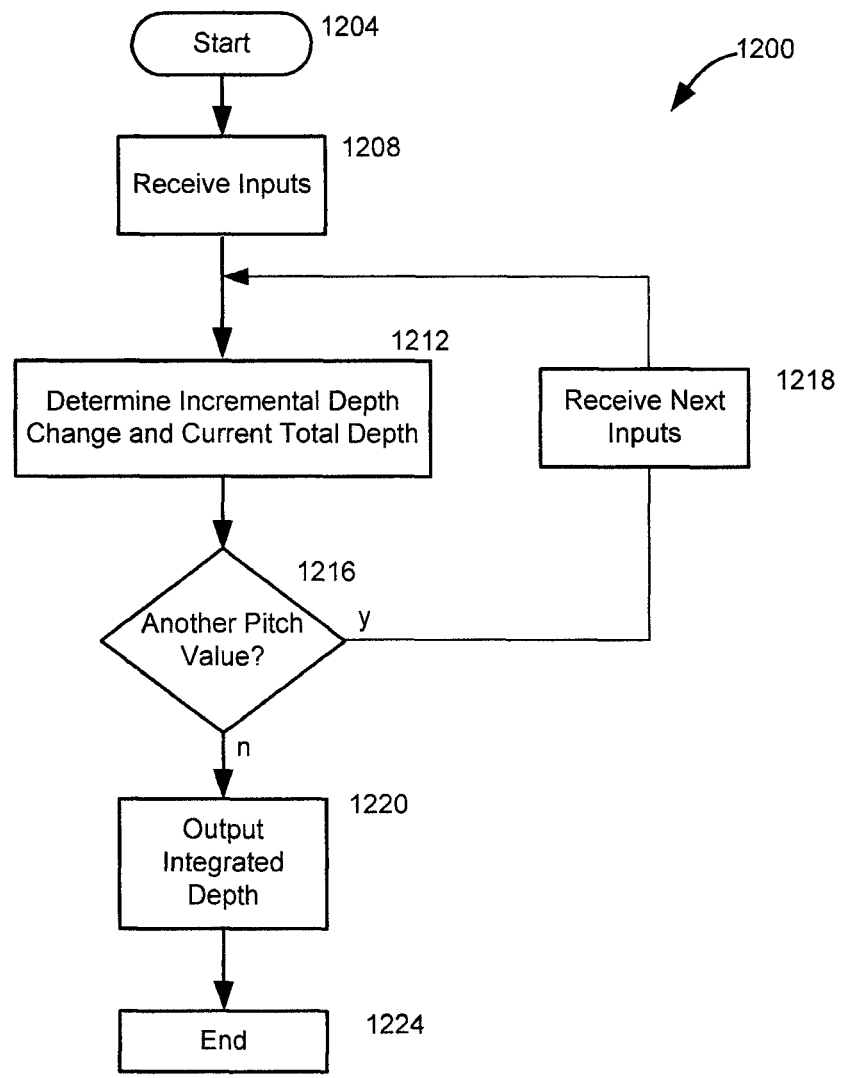

FIG. 17 is a flow diagram that illustrates an embodiment of a method for performing the integrated depth technique.

Figure 18:
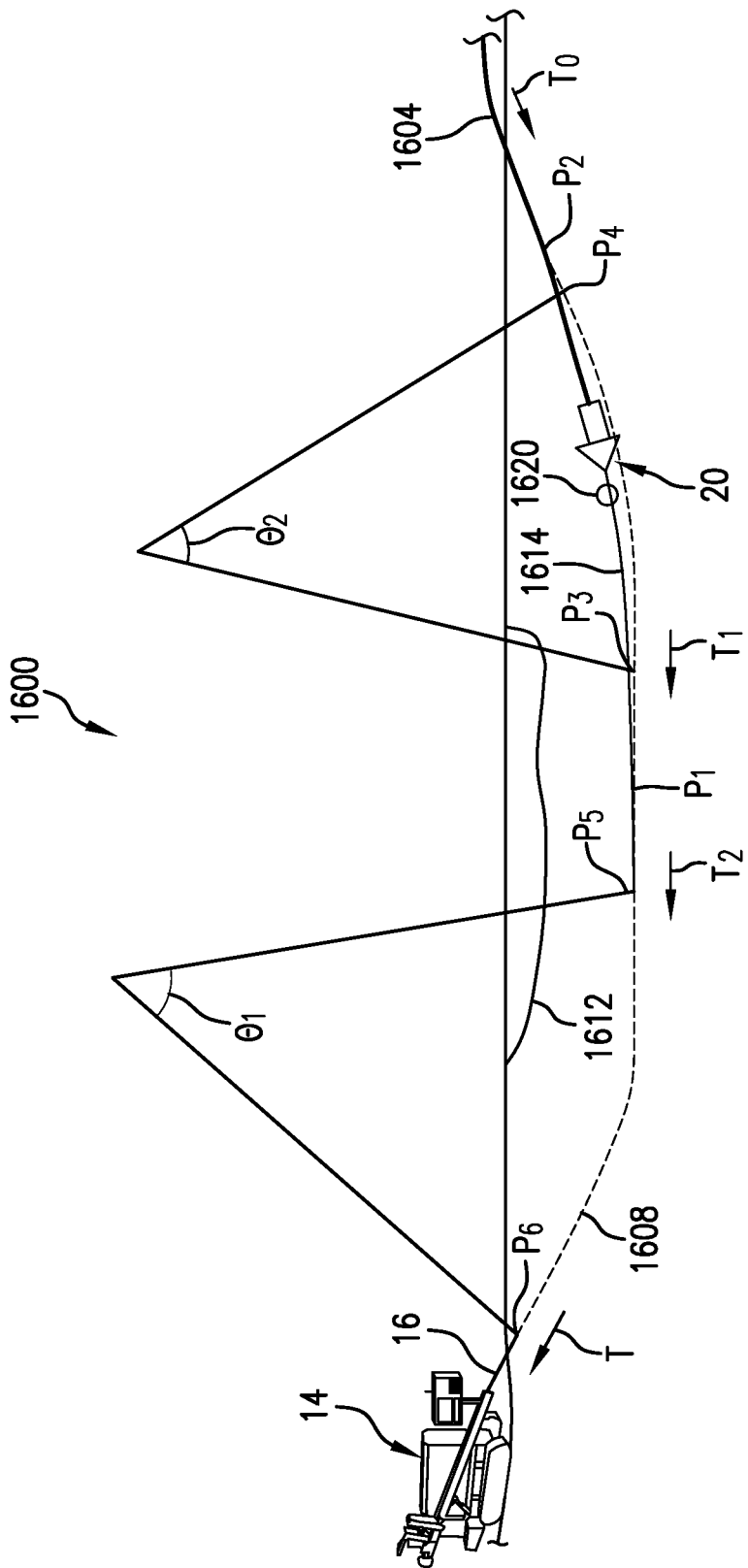

FIG. 18 is a diagrammatic view, in elevation, of a region in which a back-reaming operation is in progress, shown here for purposes of illustrating the occurrence of drill string key-holing and to characterize the drill string key-holing from an analytical perspective.

Figure 19:
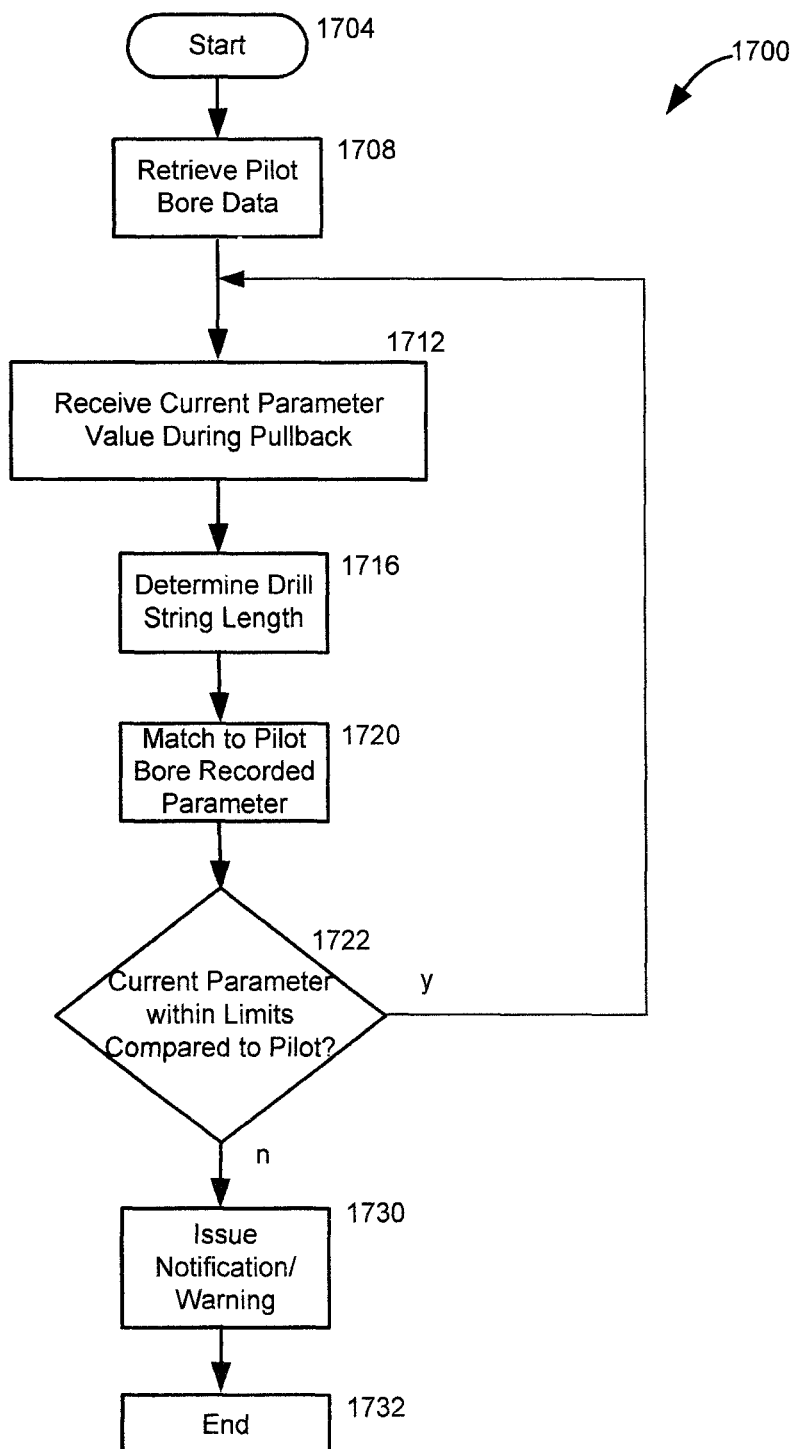

FIG. 19 is a flow diagram illustrating an embodiment of a method for detecting the drill string key-holing shown in FIG. 18.

Figure 20:
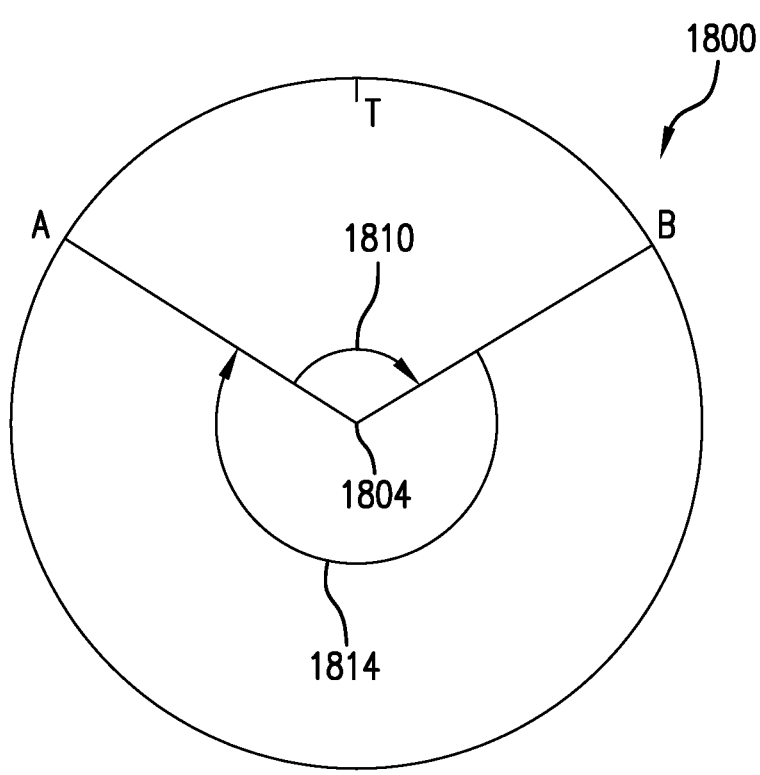

FIG. 20 is a diagrammatic illustration that is representative of roll orientation of a drill head.

Figure 21:
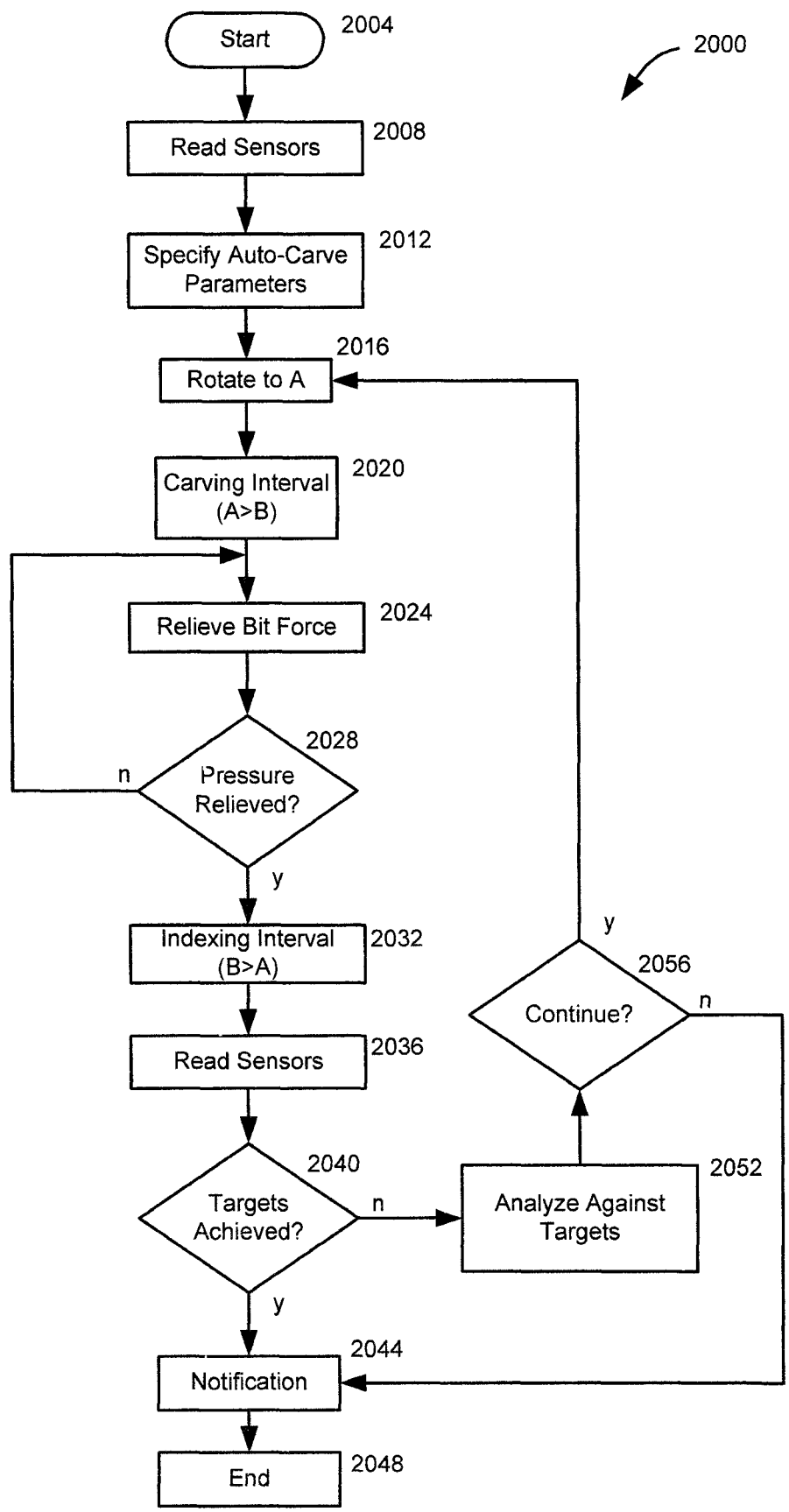

FIG. 21 is a flow diagram that illustrates an embodiment of an auto-carving method according to the present disclosure.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be used with respect to these descriptions, however, this terminology has be adopted with the intent of facilitating the reader's understanding and is not intended as being limiting. Further, the figures are not to scale for purposes of illustrative clarity.

Turning now to the figures wherein like components are indicated by like reference numbers throughout the various figures, attention is immediately directed to FIG. 1 which is an elevational view that diagrammatically illustrates an embodiment of a horizontal directional drilling system generally indicated by the reference number 10 and produced in accordance with the present disclosure. While the illustrated system shows the invention within the framework of a horizontal directional drilling system and its components for performing an inground boring operation, the invention enjoys equal applicability with respect to other operational procedures including, but not limited to vertical drilling operations, pullback operations for installing utilities, mapping operations and the like.

FIG. 1 illustrates system 10 operating in a region 12. System 10 includes a drill rig 14 having a drill string 16 extending therefrom to a boring tool 20. The drill string can be pushed into the ground to move inground tool 20 at least generally in a forward direction 22 indicated by an arrow. While the present example is framed in terms of the use of a boring tool, it should be appreciated that the discussions apply to any suitable form of inground tool including but not limited to a reaming tool, a tension monitoring tool for use during a pullback operation in which a utility or casing can be installed, a mapping tool for use in mapping the path of the borehole, for example, using an inertial guidance unit and downhole pressure monitoring. In the operation of a boring tool, it is generally desirable to monitor based on the advance of the drill string whereas in other operations such as a pullback operation, monitoring is generally performed responsive to retraction of the drill string.

With continuing reference to FIG. 1, drill string 16 is partially shown and is segmented, being made up of a plurality of removably attachable, individual drill pipe sections some of which are indicated as 1, 2, n−1 and n, having a section or segment length and a wall thickness. The drill pipe sections may be referred to interchangeably as drill rods having a rod length. During operation of the drill rig, one drill pipe section at a time can be added to the drill string and pushed into the ground by the drill rig using a movable carriage 23 in order to advance the inground tool. Drill rig 14 can include a suitable monitoring arrangement 24, which can form part of a control console yet to be described, for measuring movement of the drill string into the ground such as is described, for example, in U.S. Pat. No. 6,035,951 (hereinafter the '951 patent), entitled SYSTEMS, ARRANGEMENTS AND ASSOCIATED METHODS FOR TRACKING AND/OR GUIDING AN UNDERGROUND BORING TOOL, which is commonly owned with the present application and hereby incorporated by reference. It should be appreciated that the drill rig monitoring arrangement can monitor essentially any aspect of the operation of the drill rig. In the present embodiment, a clamp monitor 26 can monitor the status of a clamp that is used to grip the uphole end of the drill string for purposes of installing a new drill pipe section onto the drill string. This operation involves applying a substantial torque to the new drill pipe section as it threadingly engages the uphole end of the drill string. Drill rig monitoring arrangement 24 can also monitor a footage counter 28 having a transmitter unit 29a and a detector unit 29b. Transmitter unit 29a, by way of non-limiting example, can transmit ultrasonic sound 30 for reception by detector unit 29b. Thus, relative movement of carriage 23 can be monitored with a high degree of precision for purposes of characterizing drill string operations that affect the length of the drill string. It should be appreciated that, in another embodiment, a laser beam can be used to monitor the change in relative position of carriage 23. In this latter embodiment, a laser emitter/detector pair can be positioned at reference number 29a while a mirror is positioned at reference number 29b. By tracking the status of clamp monitor 26 in conjunction with movement of carriage 23, the length of drill string 16 can be established with a precision, for example, on the order of a fraction of an inch.

In particular, the length of the drill string changes responsive to movement of the carriage when the carriage engages the uphole end of the drill string and the clamp monitor indicates that the drill string is unclamped. Drill rig monitor 24 can also monitor a pressure sensor and flow meter 31 that senses the pressure and flow rate of drilling fluid or mud that can be pumped down the drill string at relatively high pressure, as yet to be described. In some embodiments, a mud pump 32, which is used to pump drilling mud/fluid down the drill string can also be monitored by drill rig monitor 24. Another sensor that can be monitored by rig monitor 24 comprises at least one gas detector 33 that can be configured to detect certain gases that are being emitted in the proximity of the drill rig such as, for example from the pit at which the drill string penetrates the ground or from the uphole end of the drill string, as will be further discussed with regard to cross-bore detection. In this regard, it is noted that the gas detector can be configured to detect natural gas and other forms or additional types of gas such as, for example, sewer line gas, either individually or in any suitable combination.

Each drill pipe section defines a through opening 34 (one of which is indicated) extending between opposing ends of the pipe section. The drill pipe sections can be fitted with what are commonly referred to as box and pin fittings such that each end of a given drill pipe section can threadingly engage an adjacent end of another drill pipe section in the drill string in a well known manner. Once the drill pipe sections are engaged to make up the drill string, the through openings of adjacent ones of the drill pipe sections align to form an overall pathway 36 that is indicated by an arrow. Pathway 36 can provide for a pressurized flow of drilling fluid or mud, consistent with the direction of arrow 36, from the drill rig to the drill head, as will be further described.

The location of the boring tool within region 12 as well as the underground path followed by the boring tool may be established and displayed at drill rig 14, for example, on a console 42 using a display 44. The console can include a processing arrangement 46 and a control actuator arrangement 47.

Boring tool 20 can include a drill head 50 having an angled face for use in steering based on roll orientation. That is, the drill head when pushed ahead without rotation will generally be deflected on the basis of the roll orientation of its angled face. On the other hand, the drill head can generally be caused to travel in a straight line by rotating the drill string as it is pushed as indicated by a double headed arrow 51. Of course, predictable steering is premised upon suitable soil conditions. It is noted that the aforementioned drilling fluid can be emitted as jets 52 under high pressure for purposes of cutting through the ground immediately in front of the drill head as well as providing for cooling and lubrication of the drill head. Boring tool 20 includes an inground housing 54 that receives an electronics package 56. The inground housing is configured to provide for the flow of drilling fluid to drill head 50 around the electronics package. For example, the electronics package can be cylindrical in configuration and supported in a centered manner within housing 54. Drill head 50 can include a box fitting that receives a pin fitting of inground housing 54. An opposing end of the inground housing can include a box fitting that receives a pin fitting of a coupling adapter 60. An opposing end of coupling adapter 60 can include a box fitting that receives a pin fitting which defines a distal, inground end of the drill string. It is noted that the box and pin fittings of the drill head, the inground housing and the coupling adapter are generally the same box and pin fittings as those found on the drill pipe sections of the drill string for facilitating removable attachment of the drill pipe sections to one another in forming the drill string. Inground electronics package 56 can include a transceiver 64 which, in some embodiments, can transmit a locating signal 66 such as, for example, a dipole locating signal, although this is not required. In some embodiments, transceiver 64 can receive an electromagnetic signal that is generated by other inground components and/or above ground components as will be described at appropriate points below. The present example will assume that the electromagnetic signal is a locating signal in the form of a dipole signal for descriptive purposes. Accordingly, the electromagnetic signal may be referred to as a locating signal. It should be appreciated that the dipole signal can be modulated like any other electromagnetic signal and that the modulation data is thereafter recoverable from the signal. The locating functionality of the signal depends, at least in part, on the characteristic shape of the flux field and its signal strength rather than its ability to carry modulation. Thus, modulation is not required. Information regarding certain parameters of the boring tool such as, for example, pitch and roll (orientation parameters), temperature and drilling fluid pressure can be measured by a suitable sensor arrangement 67 located within the boring tool or any inground tool that is in use which may include, for example, a pitch sensor, a roll sensor, a temperature sensor, an AC field sensor for sensing proximity of 50/60 Hz utility lines and any other sensors that are desired such as, for example, a DC magnetic field sensor for sensing yaw orientation (a tri-axial magnetometer, with a three axis accelerometer to form an electronic compass to measure yaw orientation). The pressure sensor in the inground tool can sense the fluid pressure in the annular region surrounding the drill head or other down hole assembly such as, for example, a reaming arrangement that is used in utility pullback operations. By way of non-limiting example, one suitable embodiment of such a pressure sensing arrangement is disclosed in commonly owned U.S. application Ser. No. 13/071,302 which is hereby incorporated by reference in its entirety. Sensor arrangement 67, in some embodiments, can include a gas sensor that can be configured to detect natural gas and/or any other gases of interest in the annular region surrounding the borehole responsive, for example, to the boring tool contacting a crossbore 68 in the form of a borehole, as will be further described. In this regard, it is noted that the gas sensor can be configured to detect other forms or additional types of gas such as, for example, sewer/wastewater line gas. Still another sensor that can be useful in cross-bore detection when forming a pilot bore is a force sensor that can measure the force that the drill head is applying to the ground as the drill string is driven into the ground by the drill rig, as will be further described. Electronics package 56 further includes a processor 70 that is interfaced as necessary with sensor arrangement 67 and transceiver 64. Another sensor that can form part of the sensor arrangement is an accelerometer that is configured for detecting accelerations on one or more axes. A battery (not shown) can be provided within the housing for producing electrical power.

A portable device 80 such as, for example, a portable walkover locator can be used to detect electromagnetic signal 66. One suitable and highly advanced portable locator is described in U.S. Pat. No. 6,496,008, entitled FLUX PLANE LOCATING IN AN UNDERGROUND DRILLING SYSTEM, which is commonly owned with the present application and is incorporated herein by reference in its entirety. As mentioned above, the present descriptions apply to a variety of inground operations and are not intended as being limiting, although the framework of horizontal directional drilling has been employed for descriptive purposes. As discussed above, the electromagnetic signal can carry information including orientation parameters such as, for example, pitch and roll. Other information can also be carried by the electromagnetic signal. Such information can include, by way of example, parameters that can be measured proximate to or internal to the boring tool including temperatures and voltages such as a battery or power supply voltage. Locator 80 includes an electronics package 82. It is noted that the electronics package is interfaced for electrical communication with the various components of the locator and can perform data processing. Information of interest can be modulated on electromagnetic signal 66 in any suitable manner and transmitted to locator 80 and/or an antenna 84 at the drill rig, although this is not required. Electronics package 82 of the locator can include a telemetry transceiver for transmitting a locator telemetry signal 92 via an antenna 94 that can be received by the drill rig using antenna 84. Any suitable form of modulation may be used either currently available or yet to be developed. Examples of currently available and suitable types of modulation include amplitude modulation, frequency modulation, phase modulation and variants thereof. Any parameter of interest in relation to drilling such as, for example, pitch may be displayed on display 44 and/or on a display 86 of locator 80 as recovered from the locating signal. Drill rig 14 can transmit a telemetry signal 96 that can be received by locator 80. Accordingly, bidirectional telemetry communication and signaling is established between antenna 84 at the drill rig and antenna 94 at the locator. As one example of such signaling, based on status provided by drill rig monitoring unit 24, the drill rig can transmit an indication that the drill string is in a stationary state because a drill pipe section is being added to or removed from the drill string. Locator 80 can further include an inground communications antenna 98 such as, for example, a dipole antenna for bidirectional reception of an inground communications signal 99 with antenna 98 arranged in electrical communication with the transceiver arrangement of electronics section 82. Accordingly, bidirectional signaling and communication is established between locator 80 via antenna 98 and transceiver 64 of the inground tool. As will be seen, this arrangement establishes a highly advantageous communications loop from locator 80, to inground tool 20 and up drill string 16 to the drill rig.

Still referring to FIG. 1, an electrical cable 100 can extend from inground electronics package 56 such that any sensed value or parameter relating to the operation of the inground tool can be electrically transmitted on this cable. One of ordinary skill in the art will appreciate that what is commonly referred to as a "wire-in-pipe" can be used to transfer signals to the drill rig. The term wire-in-pipe refers to an electrical cable that is housed within interior passageway 36 that is formed by the drill string. In accordance with the present disclosure, however, cable 100 extends to inground coupling adapter 60, as will be further described immediately hereinafter.

Figure 2:
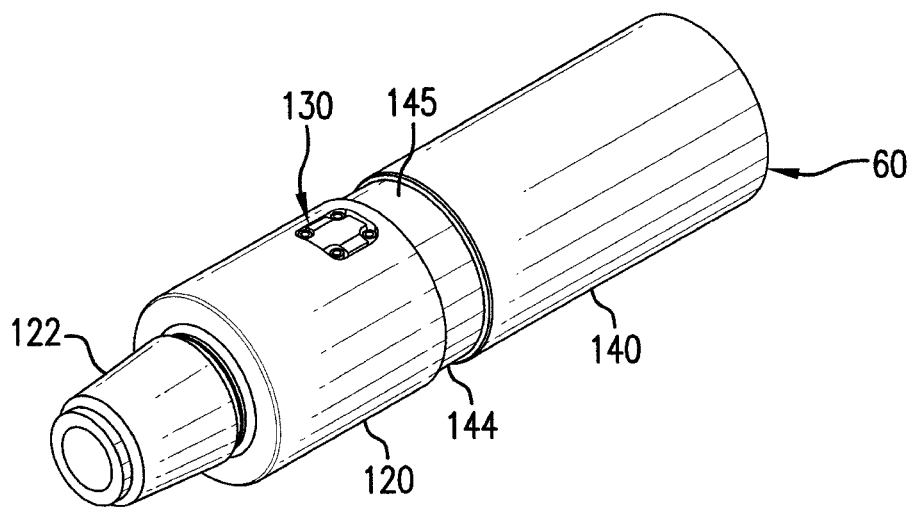
FIG. 2 is a diagrammatic perspective view of one embodiment of a coupling adapter of the present disclosure.

Attention is now directed to FIG. 2 in conjunction with FIG. 1. FIG. 2 is a diagrammatic perspective view which illustrates one embodiment of coupling adapter 60 in further detail. In particular, the coupling adapter includes a main body 120 which forms a pin fitting 122 for engaging a box fitting (not shown) of inground housing 54. It is noted that threads have not been shown on the pin fitting for purposes of illustrative clarity, but are understood to be present. The main body includes at least one high pressure electrical connection assembly 130 which will be described in further detail at one or more appropriate points below. Coupling adapter 60 further includes an extension body 140 that is removably attachable to main body 120 such that either the main body or extension body can be replaced. The main body and extension body can be formed from any suitable material such as, for example, from nonmagnetic alloys including nonmagnetic stainless steels and from magnetic alloys such as, for example, 4140, 4142, 4340 or any suitable high strength steel. Particularly when the coupling adapter is to be placed many feet or many drill rods from the electronics module which drives it, a non-magnetic version may not be needed. However, if the coupling adapter is to be used near an inground device such as, for example, a steering tool which detects the magnetic field of the Earth, the use of a nonmagnetic material avoids potential field disturbance. It is well known, in this regard, that non-magnetic, high strength alloys as opposed to their magnetic counterparts are typically much higher in cost. It is noted that there is no requirement that the main body and extension body are formed from the same material.

A cylindrical ring 144 is received between main body 120 and extension body 140. The cylindrical ring can be formed from any suitable material which is generally resistant to the inground environment and which is electrically insulative. By way of non-limiting example, one suitable material is transformation toughened zirconium oxide ceramic, other ceramic materials may also be suitable. As seen in FIG. 2 and other figures yet to be described, an outer surface 145 of cylindrical ring 144 can be inset with respect to outer surfaces of both the main body and extension body for purposes of reducing the potential of damage to the cylindrical ring as well as reducing wear on the cylindrical ring. For example, a clamp (not shown) at the drill rig that holds pipe sections, based on the inset of the cylindrical ring and in the event that the clamp happens to engage the coupling adapter, bridges across and remains out of contact with the cylindrical ring based on the inset. Further, inground wear of the cylindrical ring can be reduced due to rotation, advancement and retraction of the drill string. In this regard, it should be appreciated that electrical connection assembly 130 can be inset for similar reasons as can be seen in FIG. 2, as well as in figures yet to be described.

Figure 3:
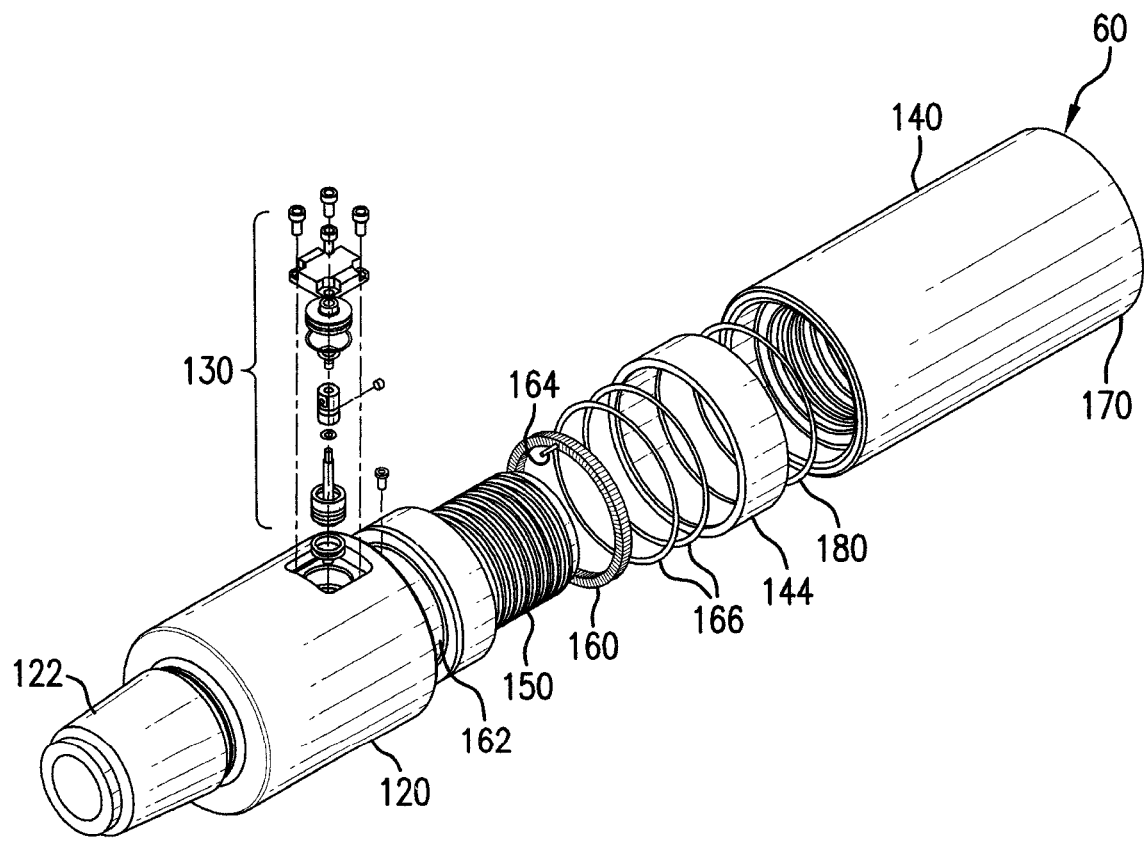
FIG. 3 is a diagrammatic exploded view, in perspective, of the embodiment of the coupling adapter of FIG. 2, shown here to illustrate details of its structure.

Referring to FIGS. 2-4, further details of the structure of coupling adapter 60 will now be provided. FIG. 3 is a diagrammatic exploded perspective view of the coupling adapter while FIG. 4 is a diagrammatic exploded elevational view, in partial cross-section, of the coupling adapter. Main body 120 includes an attachment end 150 which is threaded to threadingly engage a threaded receptacle 152 that is defined by extension body 140. It should be appreciated that threaded engagement is not a requirement and that any suitable technique can be employed for attaching the extension body to the main body, including but not limited to the use of fasteners, adhesives and a spline with spiral pins. It should be appreciated that this attachment is subject to the full torque, push force and pull force of any inground operation to which it is subjected. When a threaded embodiment is used, in order to further insure that the connection does not loosen, an epoxy can be applied or a thread locking compound such as, for example, a methacrylate adhesive or a water impervious commercial thread locking compound, before the coupling is torqued. In one embodiment, the pin of the male thread is designed to bottom as soon as the shoulders are in contact, which is well known in the relevant art as double shouldering.

A current transformer 160 is configured for installation in a transformer recess or groove 162 that is defined by main body 120. The current transformer includes a coil that is wound upon an annular or toroidal core. In this regard, the core can include any suitable cross-sectional shape such as, for example, rectangular, square and circular. In the embodiment which is illustrated, the core can be split in order to facilitate installation of the current transformer into transformer groove 162. A pair of electrical leads 164 terminate the opposing ends of the current transformer coil for forming external electrical connections yet to be described. It should be appreciated that any suitable current transformer can be used and that the particular current transformer that is described here is not intended as limiting. An opposing end 170 of extension body 140 defines a box fitting 172 for threadingly engaging the inground, distal end of the drill string. With regard to FIG. 1, it should be appreciated that coupling adapter 60 can be installed between any two adjacent ones of the drill pipe sections as the drill string is assembled at the drill rig. For example, coupling adapter 60 can be located between drill pipe sections n–1 and n in FIG. 1. Cable 100 then extends from the inground tool through drill pipe section n to reach the coupling adapter.

Referring to FIGS. 5 and 6 in conjunction with FIGS. 2-4, FIG. 5 is an elevational, assembled view, in partial cross-section, of coupling adapter 60 while FIG. 6 is a further enlarged assembled view, in partial cross-section, taken within a circle 6-6 that is shown in FIG. 5. O-rings 178 can be used for purposes of forming a seal between main body 120 and an inner surface of cylindrical ring 144, when assembled as seen in FIG. 6, for purposes yet to be described, whereas an O-ring 180 serves to stabilize the ceramic ring and limit direct contact with a flange 182 of extension body 140. O-ring 180 can contact the ceramic ring, flange 182 and a sidewall 184 of main body 120. As seen in FIG. 5, the components of coupling adapter 60 assemble to cooperatively define a through passage 190 for purposes of conducting drilling fluid as part of or in cooperation with the overall drill string when such fluid is needed by the inground tool. A pressure seal between main body 120 and extension body 140 can be accomplished, when assembled, such that drilling fluid is unable to escape between the main and extension bodies, even when the drilling fluid is under high pressure, based on a double shoulder configuration including first and second shoulders 186 and 188 (FIG. 5). Further, a suitable sealing compound such as, for example, an epoxy compound can be applied to the threads between shoulders 186 and 188 to provide for additional sealing.

With primary reference to FIG. 6 in conjunction with FIG. 4, attention is now directed to details of one embodiment of high pressure electrical connection assembly 130. In this regard, it is noted that the high pressure electrical connection assembly is shown in an exploded view in FIG. 4 and an assembled view in FIG. 6. The high pressure electrical connection assembly is arranged in a stepped aperture 200 that is defined in the sidewall of main body 120 for purposes of electrically connecting to current transformer 160. The connection assembly includes a lower insulator 204 defining grooves in which O-rings 206 are received to seal the lower insulator against the stepped periphery of aperture 200 so as to prevent the escape of pressurized fluid/fluid, for example, when used during a drilling operation. The overall shape of lower insulator 204 is that of a cup with a centered opening in the bottom of the cup. The lower insulator can be formed from any suitable electrically insulating material that is able to tolerate sometimes hostile inground environments. Such suitable materials include but are not limited to high performance polymers that are not electrical conductors. The cavity of the cup defined by the lower insulator receives a power pin 210 which can be sealed against the lower insulator using O-rings 212. The power pin defines a centered aperture 214. The power pin can be formed from any suitable electrically conductive materials that are able to tolerate the sometimes hostile inground environment. Such materials include, but are not limited to electroless nickel plated beryllium copper or phosphor bronze. A distal end 216 of cable 100 is received in the centered opening of lower insulator 204 and within centered aperture 214 of power pin 210. A set screw 220 threadingly engages a sidewall of the power pin and extends into centered cavity 214 to engage and retain distal end 216 of the cable within the power pin in a way that electrically connects the power pin to cable 100. As opposed to the use of set screw 220, any suitable arrangement may be used to retain the distal end of the cable within the power pin and electrically connected thereto.

Still referring to FIGS. 6 and 4, an upper insulator 240 is received in stepped aperture 200 and sealed thereagainst using one of O-rings 206. A set screw 242 can threadingly engage the upper insulator for purposes which will be made evident below. Upper insulator 240 can be formed from any suitable material including those materials from which lower insulator 204 can be formed. Set screw 242 is installed prior to installing upper insulator 240 and can be accessed by removing the upper insulator. An opening 246 can be defined by the upper insulator for purposes of facilitating removal of the upper insulator, for example, by receiving a threaded end of a pulling tool. A cover 260 is received against an upper step of stepped aperture 200 and can be held in place, for example, by threaded fasteners 262 (FIG. 4). The cover can be formed from any suitable material including but not limited to steel. One material that has been found to be suitable is heat treated 17-4 steel. As seen in FIG. 6, an outer surface of cover 260 can be inset with respect to outer surfaces of both the main body and extension body for purposes of reducing wear and for avoiding contact with a clamping mechanism at the drill rig.

As discussed above, current transformer 160 is received in annular groove 162, for example, using a split annular core 270. Leads 164a and 164b extend from a coil 272 of the current transformer. Lead 164a is captured in electrical connection with main body 120 by a set screw 276. Lead 164b is extended through an inside passage 280 which is defined by main body 120 and leads from annular groove 162 to stepped aperture 200. The end of lead 164b is captured in electrical connection with power pin 210 by set screw 242 such that current transformer lead 164b is electrically connected to cable 100. Any suitable arrangement can be used for forming an electrical connection between lead 164b and the power pin. The current transformer is designed with at least the following in mind:
1. Shock and vibration. The material selection and construction should withstand the shock and vibration for the downhole drilling environment.
2. Magnetic material selection should be based on low core loss at the operating frequency, high flux saturation and mechanical robustness.
3. High flux saturation permits a reduction in cross-sectional area of the magnetic core, to provide for increasing the cross-sectional area of the adapter coupling main body for torque and power transmission.
4. Low inter winding capacitance for high frequency response.

In view of the foregoing, in one embodiment and by way of non-limiting example, a tape wound core can be used. As will be familiar to one of ordinary skill in the art such cores are less susceptible to shock and vibration than ferrite cores. Such a tape wound core can be produced using a thin, high magnetic flux saturation tape in order to avoid eddy current losses in the core. In some embodiments, the tape thickness can range from 0.00025" to 0.001". One suitable thickness is 0.0007". The tape wound core can be finished, for example, using powder coating or epoxy coating. In one embodiment, additional vibration and shock protection can be provided for the current transformer and its core based on the manner by which the current transformer is mounted in groove 162.

The current transformer can use the drill pipe in the manner of a single turn secondary and the surrounding soil to form a complete current path. The primary winding of the current transformer can convert a low current output from the drive electronics to a high current signal on the drill pipe with the drill pipe itself serving as the single turn secondary. Of course, the terms, primary and secondary can be used interchangeably based on the direction of signal coupling and have been applied here for descriptive and non-limiting purposes. The current ratio is proportional to the number of turns on the primary. For example, neglecting magnetic and resistive losses, if the current into the primary is 10 mA rms, the current induced on the drill pipe will be 1000 mA which is one hundred times higher than the input current if the ratio of primary to secondary turns is 100/1. As noted above, the tape wound core can be encapsulated in epoxy for added mechanical strength, using any suitable thermal plastic or epoxy. The finished core or toroid can be cut, for example, with a diamond saw into two half cores for installation purposes with the transformer windings applied to each core half. A small gap, for example, of about 0.001" can be formed between the confronting surfaces of the core half ends by bonding a piece of non-magnetic material, such as Mylar, a strong polyester film between the confronting surfaces, to create a magnetic gap. This gap helps to prevent magnetic saturation of the core. As is well known in the art, the cross-section of the core can be determined by the frequency, flux density, number of turns of magnet wire (for example, an insulated copper wire), saturation flux density and applied voltage to the current transformer. With frequency from a few kilohertz to a hundred kilohertz, the cross-section, by way of example, can be approximately 0.2" by 0.2". In some embodiments, the current transformer can be shock mounted in the adapter groove.

Assembly of the embodiment shown in FIG. 6 can proceed, for example, by first installing current transformer 160 into annular groove 162. Cable 100 can be extended into through passage 190 of the main body and out of stepped aperture 200. Lower insulator 204 can then be installed onto cable 100 with power pin 210 installed onto the distal end of the cable by tightening set screw 220. The power pin can be received in the stepped periphery as seen in FIG. 6. Current transformer lead 164b can be threaded through passage 280 having its distal end positioned as shown in FIG. 6. Upper insulator 240 can then be installed and set screw 242 tightened. Cover 260 can then be installed. Installation of current transformer lead 164a and cylindrical ring 144 proceed in a straightforward manner. It should be appreciated that the current transformer, cylindrical ring and high pressure electrical connector assembly are readily replaceable/repairable in the field.

Figure 7A:
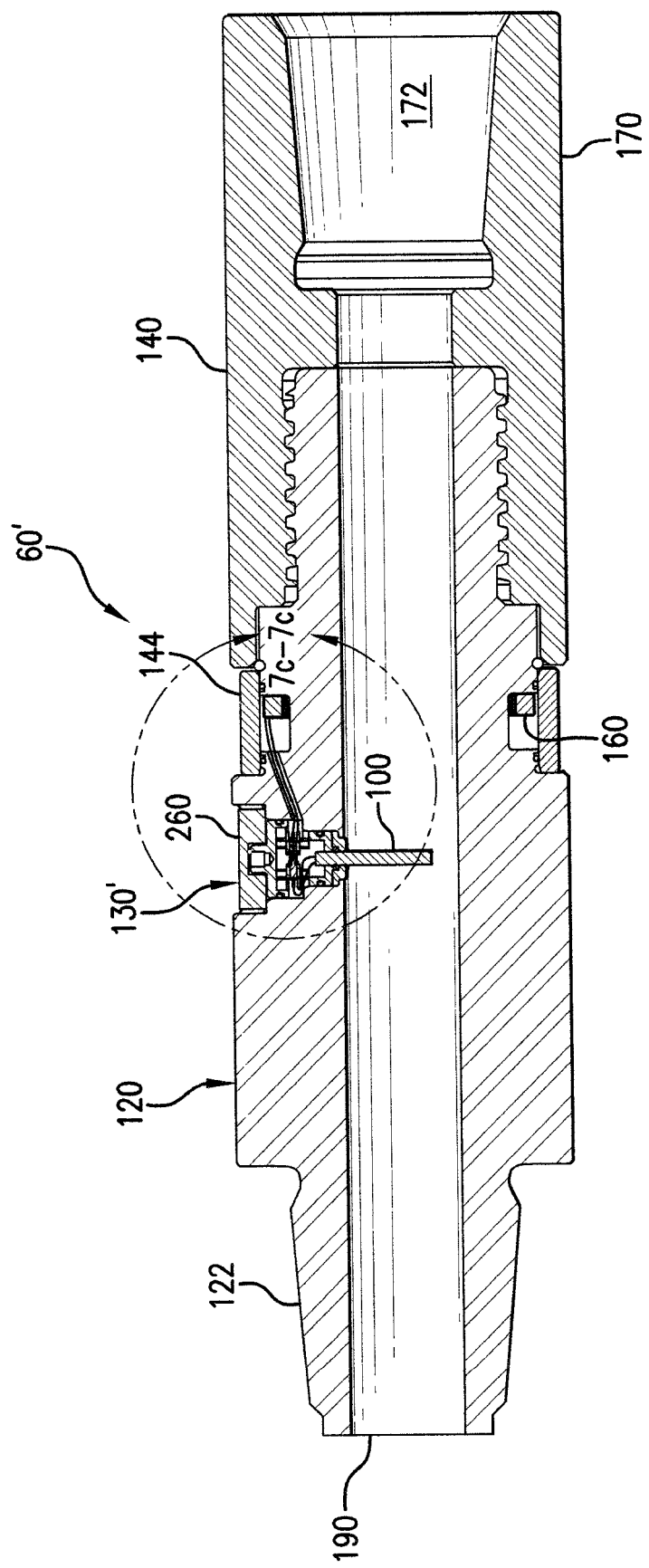
FIG. 7a is an elevational view, in diagrammatic partial cross-section, showing another embodiment of the coupling adapter of the present disclosure which electrically isolates both leads of the current transformer from the drill string.

Referring to FIG. 7a, another embodiment of a coupling adapter in accordance with the present disclosure is generally indicated by the reference number 60' and shown in a partially cross-sectional view. Descriptions of like components, shown in previous figures, have not been repeated for purposes of brevity. In this regard, the difference between the present embodiment and the previously described embodiment resides primarily in the configuration of electrical connection assembly 130' as part of a modified main body 120', as will be described in detail immediately hereinafter.

Figure 7B:
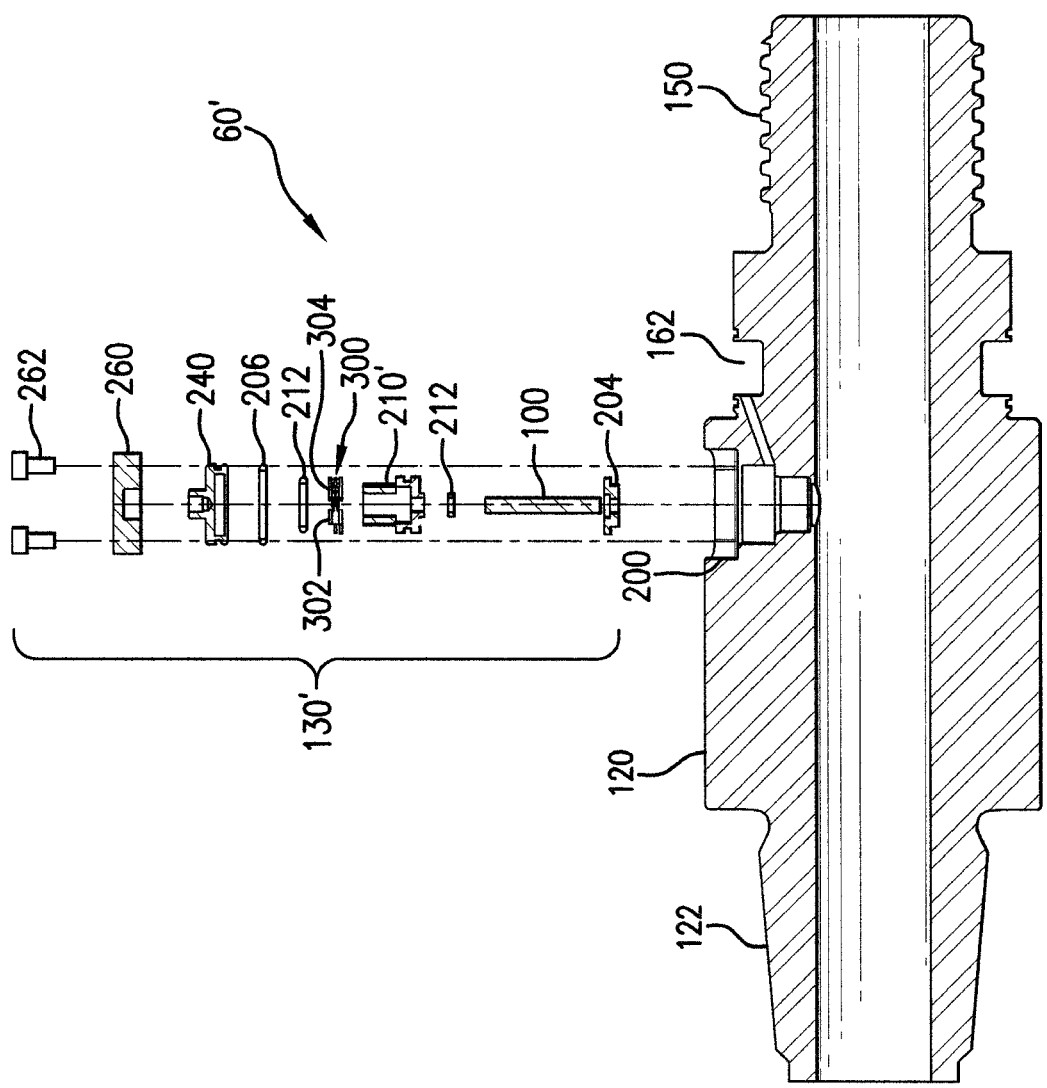
FIG. 7b is a diagrammatic exploded view, in elevation and partial cross-section, of the embodiment of the coupling adapter of FIG. 7a, shown here to still further illustrate details of its structure.
Figure 7C:
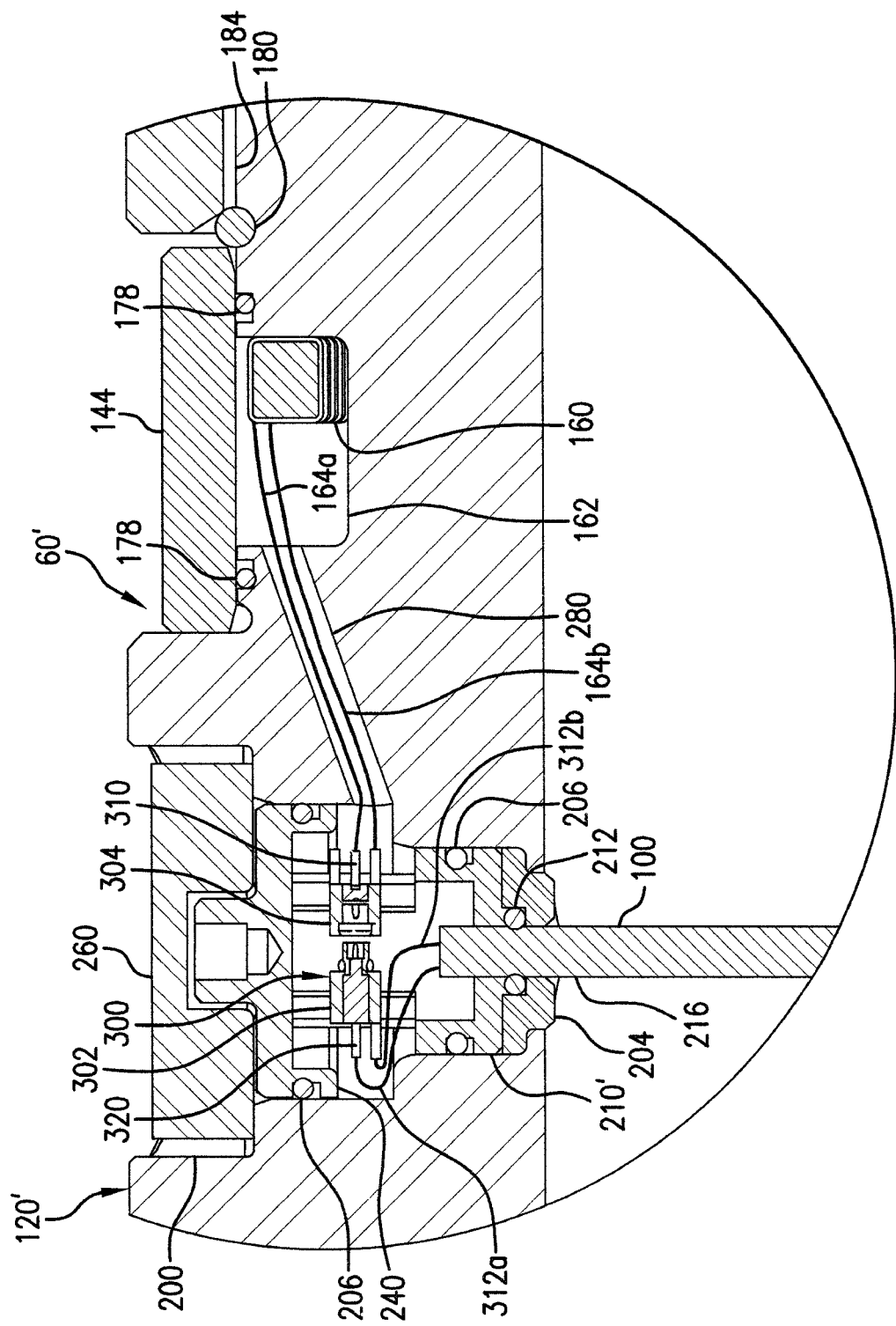
FIG. 7c is a further enlarged diagrammatic fragmentary view, in elevation and partial cross-section, taken within a circle 7c-7c in FIG. 7a, shown here to illustrate details with respect to electrical connections in the embodiment of FIGS. 7a and 7b.

Turning to FIGS. 7*b* and 7*c* in conjunction with FIG. 7*a*, a modified power pin 210' has been provided. FIG. 7*b* is an elevational, exploded view in partial cross section while FIG. 7*c* is a fragmentary view in elevation and partial cross-section, taken within a circle 7*c*-7*c* show in FIG. 7*b*. In this embodiment, modified power pin 210' is configured for supporting a coaxial connector assembly 300 including a coaxial plug 302 and a coaxial receptacle 304. While FIG. 7*c* shows plug 302 and receptacle 304 disconnected for purposes of illustrative clarity, it is to be understood that the plug and receptacle are mated for operation of the assembly. Current transformer leads 164*a* and 164*b* extend through inside passage 280 and are electrically connected to a pair of terminals 310 of receptacle 304. Electrical conductors 312*a* and 312*b* from cable 100, which can be a coaxial cable in this embodiment, are electrically connected to a pair of terminals 320 of plug 302. It is noted that some components such as, for example, upper insulator 240 can be subject to minor modification in order to accommodate coaxial connector assembly 300, however, such minor modifications are considered to be within the capabilities of one having ordinary skill in the art with this overall disclosure in hand. It should be appreciated that the electrical connections to current transformer 160 from cable 100 are maintained in electrical isolation from the adapter body and therefore from the drill string itself. This isolation can reduce common mode noise that may be coupled onto the drill string, for example, as the result of the presence of 50 Hz or 60 Hz ground current and noise in an inground environment.

In view of the foregoing, it should be appreciated that, in some cases, a drill pipe section can be configured to support a current transformer in a manner that is consistent with the descriptions above, for example, when the drill pipe section includes a sidewall thickness that is sufficiently thick for purposes of defining a support groove for the current transformer without unduly weakening the drill pipe section. Additionally, a drill pipe section having a sidewall of sufficient thickness can support the electrical connections, passages and assemblies described above with limited or no modification as will be recognized by one having ordinary skill in the art with this overall disclosure in hand.

Figure 8:
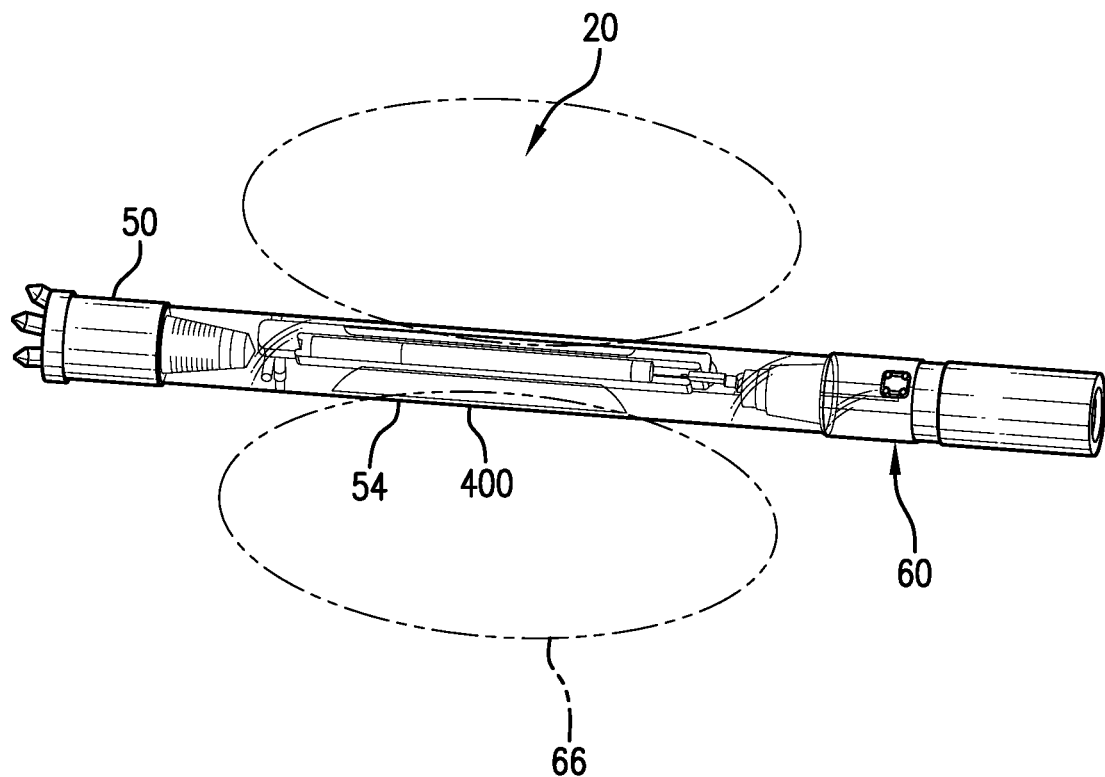
FIG. 8 is a diagrammatic view, in perspective, of one embodiment of an inground tool in the form of a drill head and inground housing connected to the coupling adapter of the present disclosure.

FIG. 8 is a diagrammatic view, in perspective, which illustrates inground tool 20 in the form of a boring tool having drill head 50. In this embodiment, inground housing 54 includes slots 400 for purposes of emitting signal 66 from transceiver 64 (FIG. 1). Coupling adapter 60 is removably attached to inground housing 54 which is itself ready for removable attachment to a distal end of the drill string.

Figure 9:
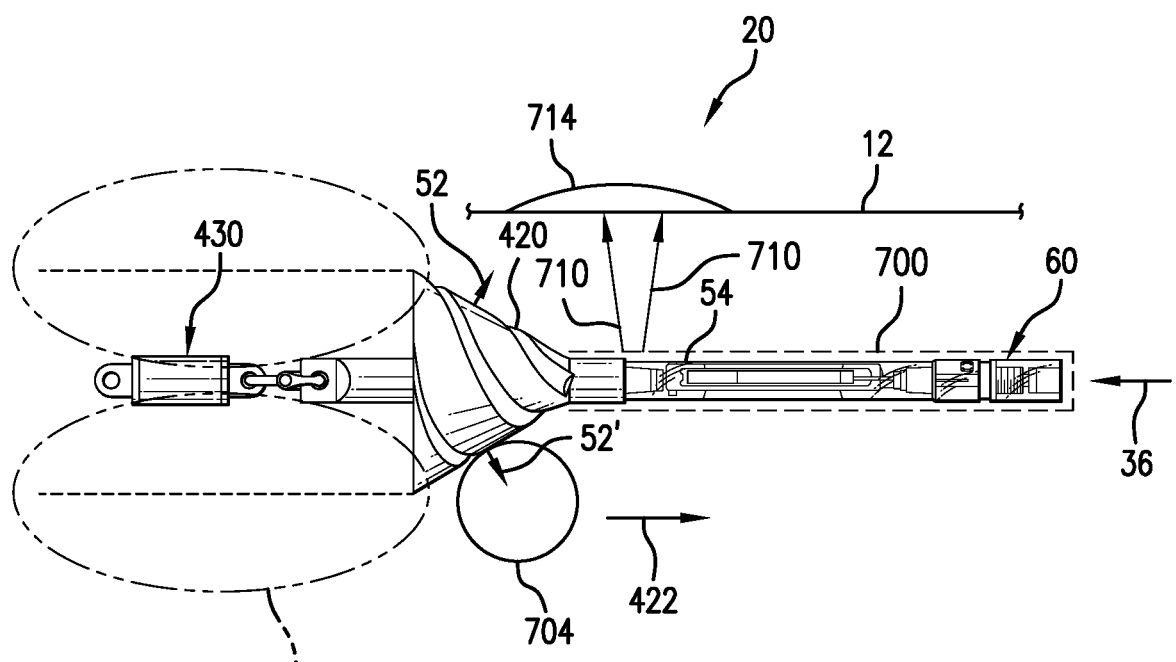
FIG. 9 is a diagrammatic view, in perspective of another embodiment of an inground tool in the form of a tension monitor and reaming tool connected to the coupling adapter of the present disclosure.

FIG. 9 is a diagrammatic view, in perspective, which illustrates inground tool 20 in the form of a reaming tool including a reamer 420 that is removably attached to one end of inground housing 54. Housing 54 and coupling adapter 60 are otherwise provided in this embodiment in the same manner as in FIG. 8. The reaming tool is pulled in a direction 422, which is indicated by an arrow, for purposes of enlarging a borehole as the reaming tool is pulled toward the drill rig by the drill string. An opposing end of the reaming tool is attached to one end of a tension monitoring arrangement 430. An opposing end of the tension monitoring arrangement can be attached to a utility (not shown) that is to be pulled through the enlarged borehole for installation of the utility in the borehole. Tension monitoring arrangement 430 measures the pull forces that are applied to the utility during the reaming operation. One suitable and highly advantageous tension monitoring arrangement is described in U.S. Pat. No. 5,961,252 which is commonly owned with the present application and incorporated herein by reference in its entirety. Tension monitoring arrangement 430 can transmit an electromagnetic signal 434 upon which tension monitoring data can be modulated. In an embodiment, tension monitoring arrangement 430 can sense the surrounding downhole pressure and modulate this pressure data onto signal 434. The latter can be received by transceiver 64 (FIG. 1) such that corresponding data can be placed upon the drill string using current transformer 160 (see FIGS. 3-6) for transmission to the drill rig. It should be appreciated that a wireless signal can be received from any form of inground tool by transceiver 64 and that the present embodiment, which describes a tension monitoring arrangement, is not intended as limiting. For example, a mapping arrangement can be used in another embodiment in place of the tension monitoring arrangement. Such a mapping arrangement can operate, for example, using an inertial navigation system (INS). It should also be appreciated that signal 434 can be detected by portable device 80 such that recovered data can be transmitted by telemetry signal 92 to the drill rig or any other suitable above ground component of the system.

Figure 10:
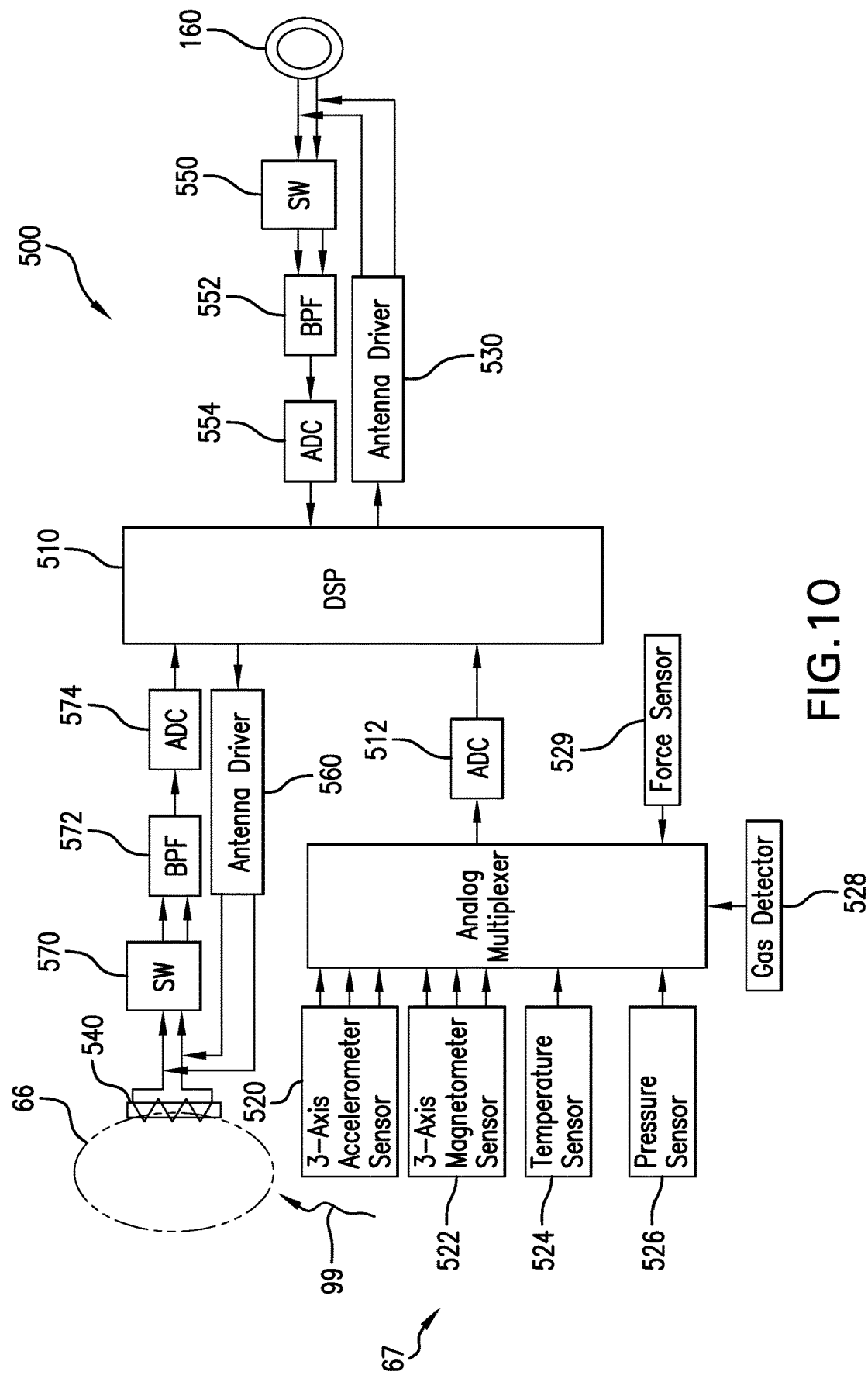
FIG. 10 is a block diagram which illustrates one embodiment of an electronics section that can be used with the coupling adapter of the present disclosure.

FIG. 10 is a block diagram which illustrates one embodiment of an electronics section, generally indicated by the reference number 500, that can be supported in inground housing 54. Section 500 can include an inground digital signal processor 510 which can facilitate all of the functionality of transceiver 64 and processor 70 of FIG. 1. Sensor section 67 is electrically connected to digital signal processor 510 via an analog to digital converter (ADC) 512. Any suitable combination of sensors can be provided for a given application and can be selected, for example, from an accelerometer 520, a magnetometer 522, a temperature sensor 524, a pressure sensor 526 which can sense the pressure of drilling fluid in the region surrounding the inground tool, and a gas sensor 528 which can be configured for detecting any desired form of gas such as, for example, natural gas, propane, other hydrocarbon gases and/or sewer gas. The gas sensor can be of any suitable type that is either currently available or yet to be developed. A force sensor 529 can measure the force that is generated during a drilling operation responsive to the drill head being forced against the soil in front of it. This sensor can be provided in any suitable manner and can even be provided in an adapter or housing that is installed in the drill string behind inground housing 54. For example, the force sensor can be installed in adapter 60. Embodiments of the force sensor, by way of non-limiting example, can utilize strain gauges, piezoelectric sensors and other commonly used load cell technologies.

Current transformer 160 can be connected for use in one or both of a transmit mode, in which data is modulated onto the drill string, and a receive mode in which modulated data is recovered from the drill string. For the transmit mode, an antenna driver section 530 is used which is electrically connected between inground digital signal processor 510 and current transformer 160 to drive the antenna. Generally, the data that can be coupled into the drill string can be modulated using a frequency that is different from any frequency that is used to drive a dipole antenna 540 that can emit aforedescribed signal 66 (FIG. 1) in order to avoid interference. When antenna driver 530 is off, an On/Off Switcher (SW) 550 can selectively connect current transformer 160 to a band pass filter (BPF) 552 having a center frequency that corresponds to the center frequency of the data signal that is received from the drill string. BPF 552 is, in turn, connected to an analog to digital converter (ADC) 554 which is itself connected to digital signal processing section 510. Recovery of the modulated data in the digital signal processing section can be readily configured by one having ordinary skill in the art in view of the particular form of modulation that is employed.

Still referring to FIG. 10, dipole antenna 540 can be connected for use in one or both of a transmit mode, in which signal 66 is transmitted into the surrounding earth, and a receive mode in which an electromagnetic signal such as, for example, signal 99 (see also FIG. 1) and/or signal 434 of FIG. 9 can be received. For the transmit mode, an antenna driver section 560 is used which is electrically connected between inground digital signal processor 510 and dipole antenna 540 to drive the antenna. Again, the frequency of signals 66 and 99 will generally be sufficiently different from the frequency of the drill string signal to avoid interference therebetween. When antenna driver 560 is off, an On/Off Switcher (SW) 570 can selectively connect dipole antenna 540 to a band pass filter (BPF) 572 having a center frequency that corresponds to the center frequency of the data signal that is received from the dipole antenna. BPF 572 is, in turn, connected to an analog to digital converter (ADC) 574 which is itself connected to digital signal processing section 510. Transceiver electronics for the digital signal processing section can be readily configured in many suitable embodiments by one having ordinary skill in the art in view of the particular form or forms of modulation employed and in view of this overall disclosure.

Figure 11:
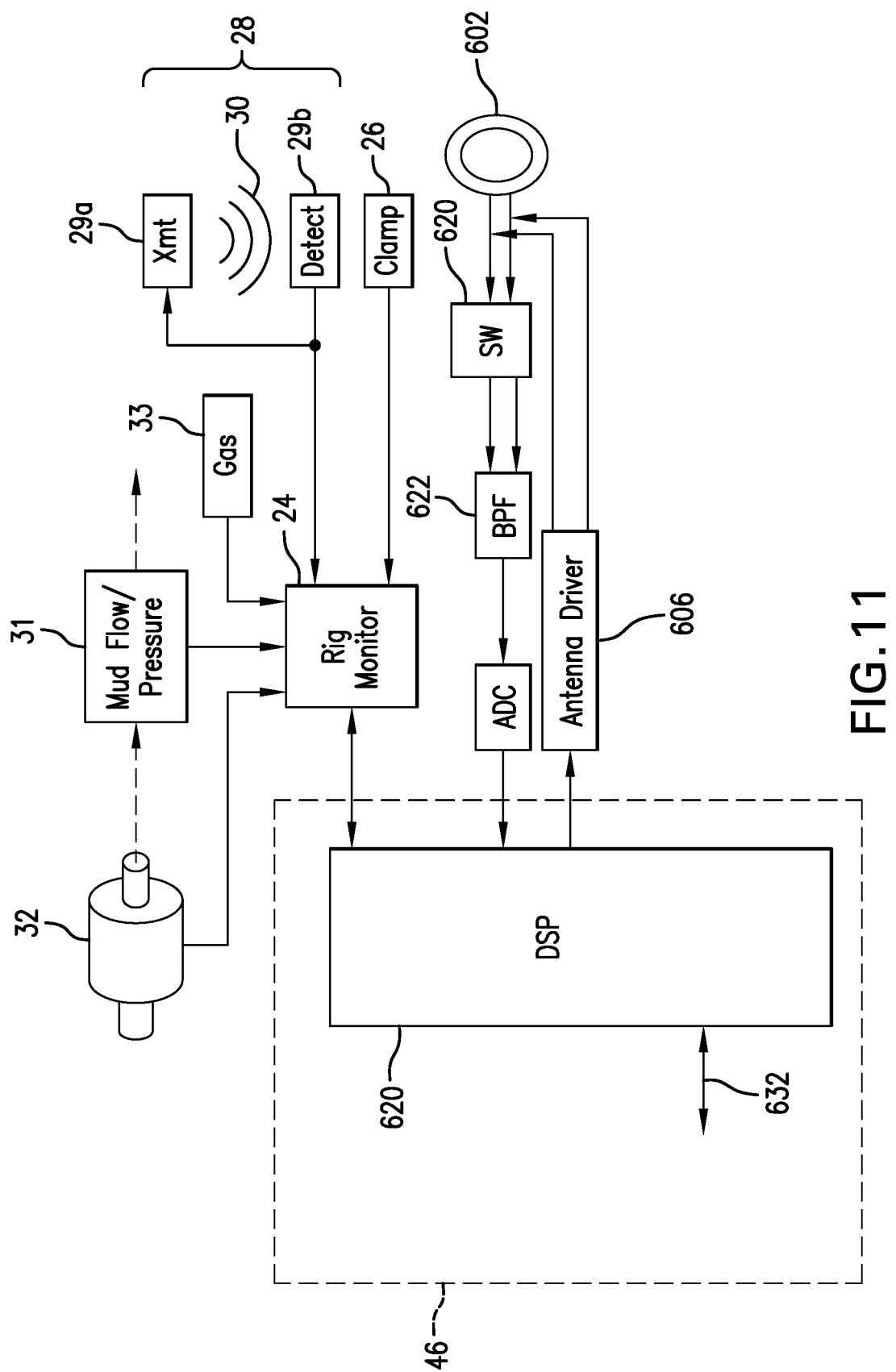
FIG. 11 is a block diagram which illustrates one embodiment of an electronics section that can be used at the drill rig or as part of a drill string repeater in cooperation with the coupling adapter of the present disclosure serving an inground tool.

Referring to FIGS. 1 and 11, the latter is a block diagram of components that can make up one embodiment of an aboveground transceiver arrangement, generally indicated by the reference number 600, that is coupled to drill string 16. An aboveground current transformer 602 is positioned, for example, on drill rig 14 for coupling and/or recovering signals to and/or from drill string 16. Current transformer 602 can be electrically connected for use in one or both of a transmit mode, in which data is modulated onto the drill string, and a receive mode in which modulated data is recovered from the drill string. A transceiver electronics package 606 is connected to the current transformer and can be battery powered. For the transmit mode, an antenna driver section 610 is used which is electrically connected between an aboveground digital signal processor 620 and current transformer 602 to drive the current transformer. Again, the data that can be coupled into the drill string can be modulated using a frequency that is different from the frequency or frequencies that are used to drive dipole antenna 98 in the portable locator and antenna 540 in inground housing 54, as seen in FIG. 1, in order to avoid interference as well as being different from the frequency at which current transformer 160 (FIG. 10) couples a signal onto the inground end of the drill string. When antenna driver 610 is off, an On/Off Switcher (SW) 620 can selectively connect current transformer 602 to a band pass filter (BPF) 622 having a center frequency that corresponds to the center frequency of the data signal that is received from the drill string. BPF 622 is, in turn, connected to an analog to digital converter (ADC) 630 which is itself connected to digital signal processing section 620. It should be appreciated that digital signal processing section 620 and related components can form part of processing arrangement 46 (shown using a dashed line) of the drill rig or be connected thereto on a suitable interface 632. Transceiver 606 can send commands to the inground tool for a variety of purposes such as, for example, to control transmission power, select a modulation frequency, change data format (e.g., lower the baud rate to increase decoding range) and the like. Transceiver electronics for the digital signal processing section can be readily configured in many suitable embodiments by one having ordinary skill in the art in view of the particular form or forms of modulation employed and in view of this overall disclosure.

Referring to FIG. 1, in another embodiment, another coupling adapter 60 and another instance of inground housing 54 or 54', with current transformer 160 connected to transceiver 606 (FIG. 11) be inserted as a unit into one of the joints of the drill string to serve in the manner of a repeater, by way of example, 1000 feet from the inground tool. The repeater unit can be inserted in the joint formed between drill pipe sections 1 and 2 in FIG. 1. The inground housing, for use in a repeater application, can include a box fitting at one end and a pin fitting at an opposing end. Of course, one of ordinary skill in the art will recognize that box to pin fitting adapters are well known and readily available. In another embodiment, coupling adapter 60 can be inserted into a joint with the repeater electronics housed in a pressure barrel that can be supported by centralizers within the through passage of an adjacent drill pipe section. In yet another embodiment, the repeater electronics can be placed in an end loaded or side loaded housing and inserted into the drill string and with electrical communication to the coupling adapter. Such end or side loaded housings can include passages that allow for the flow of drilling fluid therethrough. In any of these embodiments, of course, the repeater electronics can be electrically connected to the coupling adapter current transformer in a manner that is consistent with the descriptions above. In order to avoid signal interference and by way of non-limiting example, the current transformer can pick up the signal originating from the inground tool or another repeater at one carrier frequency and the repeater electronics can retransmit the signal up the drill string from the current transformer at a different carrier frequency in order to render the received signal distinguishable from the repeater signal that is coupled back to the drill string. As another example, suitable modulation can be used to make the repeater signal distinguishable from the received signal. Thus, the repeater electronics package is received in the housing cavity of the inground housing and is in electrical communication with the signal coupling arrangement of the coupling adapter for producing a repeater signal based on the received data signal, but which is distinguishable from the received data signal. The repeater signal is provided to the signal coupling arrangement such that the signal coupling arrangement electromagnetically couples the repeater signal back to the drill string for transfer of the repeater signal as another electrical signal along the drill string such that the repeater signal is electrically conducted by at least some of the electrically conductive drill pipe sections making up a different portion of the drill string.

Referring to FIGS. 1 and 9, as described above, drilling fluid can be pumped downhole along pathway 36 in each of the drilling operation of FIG. 1 and the pullback operation that is illustrated by FIG. 9 which can utilize reaming tool 420 that pulls a utility (not shown) uphole in the direction of arrow 422 through a pilot hole 700 which is partially shown in FIG. 9 and indicated by dashed lines. It should be appreciated that reamer 420 can likewise be configured to emit drilling fluid, for example, in the form of jets 52, as described with regard to FIG. 1.

One concern that is associated with inground operations such as described above resides in the risk that is associated with striking existing inground utilities. In the context of the present application such existing utilities may be referred to interchangeably as cross-bores. Unfortunately, even when every reasonable precaution is taken in order to avoid striking a cross-bore such as, for example, utilizing utility companies to designate positions of in ground utilities and any available utility maps of the operational site for purposes of bore planning, there exists the possibility of a cross-bore strike at least for the reason that there can be unknown utilities. Such a situation is illustrated by FIG. 1 in which boring tool 20 has struck cross-bore 68 which, for purposes of the present example, is assumed to be an existing, but unknown sewer line. As seen in FIG. 1, drilling fluid jets 52 are being emitted directly into the sewer line. Unfortunately, it is difficult for the operator of drill rig 14 to detect these circumstances at least for the reason that the transit time through cross-bore 68 may be very brief. Subsequently, during a pullback operation to install a utility in pilot bore 700 of FIG. 9, the reamer and utility line can rapidly transit through the cross-bore. Ultimately, the result can be a new utility line passing directly through an original utility line such as a sewer line which will effectively block the sewer line. Subsequent efforts to clear the sewer line can result in severing or at least damaging the new utility. Consequences of such damage can be severe, for example, if the new utility is a gas line, since damaging the gas line can create a path for the flow of natural gas directly into a structure. In some cases, as illustrated by FIG. 9, a cross-bore 704 can be positioned outside of pilot bore 700 such that the boring tool does not strike the cross-bore, yet the cross-bore is sufficiently close to be contacted by reaming tool 420 thereby creating a flow path from the annular region surrounding the reamer directly into the cross-bore. FIG. 9 illustrates a particular jet 52' being emitted directly into cross-bore 704. In some cases, contact between the reamer and the cross-bore can result from what can be referred to as "key-holing" in which the utility pullback tends to straighten curves that may be purposefully formed in the pilot bore. In any case, the result can be an undesirable intersection between the new utility and the existing utility.

Referring to FIG. 9, another concern relating to drilling fluid relates to what is typically referred to as a frac-out. The latter can occur during either a drilling operation or a reaming operation with drilling fluid 710 escaping, as indicated by arrows, to form a puddle or pool 714 on the surface of the ground. In some cases, a blister is formed which at least temporarily elevates the surface of the ground. Concerns with regard to frac-outs can relate to contamination as a result of the drilling fluid mixing with ground water and/or damaging existing surface structures such as roadways and sidewalks.

The present disclosure brings to light systems, apparatus and associated methods that are directed to the detection of at least potential cross-bore contact and frac-out conditions. By making the operator aware of these conditions, the operator can take appropriate actions such as, for example, pot-holing to confirm the existence of the potential cross-bore and initiating appropriate precautions and repairs, if needed.

Referring to FIGS. 1, 10 and 11, Applicants recognize that certain conditions, that can be monitored in accordance with these figures, are at least potentially indicative of cross-bore and/or frac-out conditions. In some cases, particular kinds of information can be useful in attempting to distinguish between the two conditions, however, both conditions are of concern to the system operator. As will be seen, determinations can be made on the basis of combinations of information and data that can be collected from downhole as well as uphole, above ground sources.

Figure 12A:
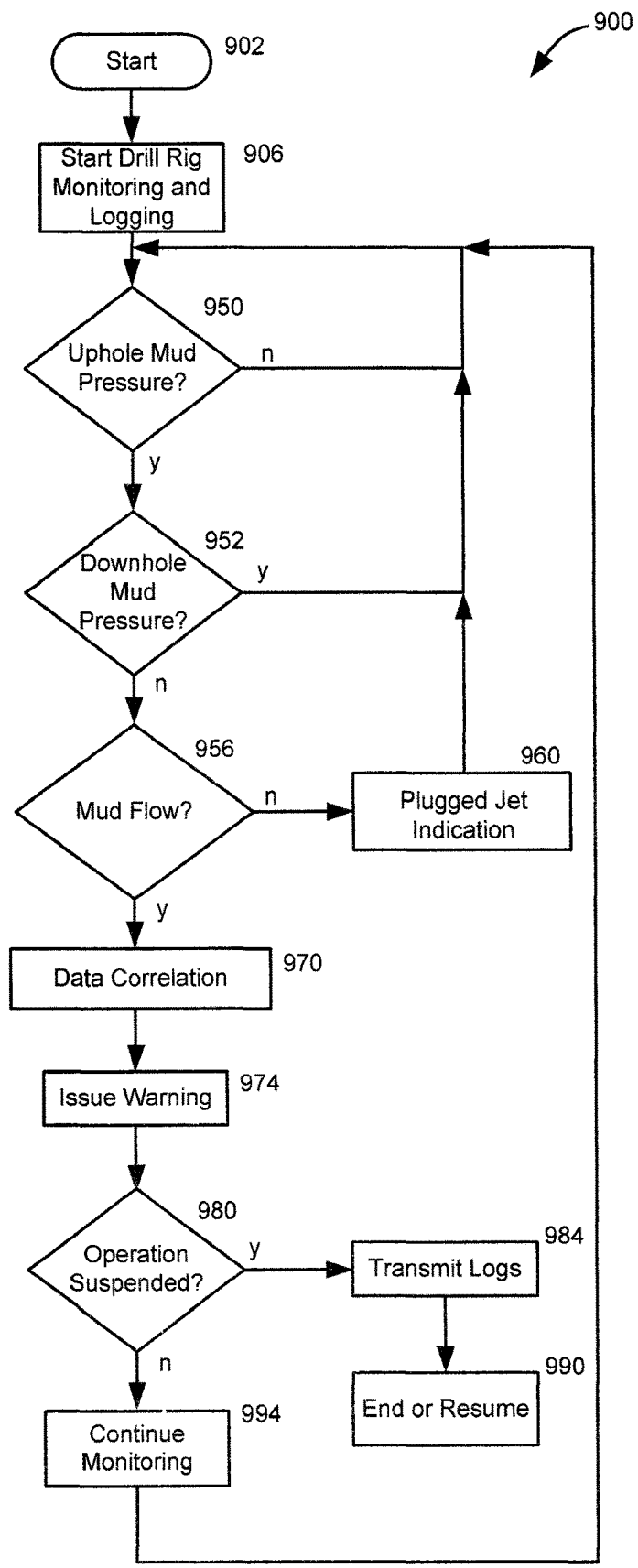
FIG. 12a is a flow diagram that illustrates an embodiment of a method for monitoring various combinations of data from drill rig based and downhole based sensors to provide for detection of various adverse operational conditions.

Attention is now directed to FIG. 12a illustrating an embodiment of a method, generally indicated by the reference number 900 for monitoring various parameters that, in combination, can indicate potential cross-bore and/or frac-out conditions. The method begins at start 902 and proceeds to step 906 which can initiate system monitoring including monitoring via drill rig monitor 24 (FIGS. 1 and 11). The drill rig monitor can collect information relating to the various sensor arrangements that are shown in FIG. 11 including, but not limited to uphole mud pressure, mud flow rate, drill string length based on movement of the drill rig carriage and drill string clamp status, as well as any other measurable parameter at the drill rig that is of interest. Other parameters can be received by console 42 (FIG. 1), for example, by transmission from the inground tool via the drill string. Such downhole parameters include but are not limited to downhole pressure sensed by pressure sensor 526 (FIG. 10), temperature as sensed by temperature sensor 524, indications generated by a gas detector 528, orientation parameters derived from accelerometers 520, magnetometer 522 readings, and any other measurable downhole parameter that is of interest. It should be appreciated that system 10 provides for rapid update and transmission of measured parameters up the drill string to console 42 such that, at least from the perspective of the operator and from a practical standpoint, essentially real time monitoring is provided. For example, pressure signals from downhole pressure sensor 526 can be transmitted at least as often as once per second. At the same time, other information can be collected from portable locator 80. For example, the portable locator can determine the current depth of the inground tool and transmit the depth or related signals to the drill rig via telemetry signal 92.

Referring to FIG. 1 in conjunction with FIG. 12a, data generated at the portable locator or other above ground device, in the context of method 900 and/or for purposes of other techniques, can be transmitted directly to the inground tool via communications signal 99 and then transmitted up the drill string to the drill rig via processor 70 and coupling adapter 60 to console 42 at the drill rig. Any signal that is available at locator 80 can be transmitted via this route, whether the data that forms the basis for the signal is determined at the locator or elsewhere. By way of non-limiting example, a depth reading or other signal can be transmitted to console 42 via the inground tool using this inground communications link. In this regard, there can be operational circumstances in which the use of telemetry signal 92 is not practical such as in the case of drilling or back-reaming under conditions that include obstructions to the line of sight, local interference which can be passive and/or active and, alternatively or in conjunction therewith, drilling large distances whereby the telemetry signal is not strong enough to achieve successful communication; in this regard, the threshold for output telemetry power is typically regulated by country specific governing bodies. In such cases, communication via the inground communications link sweeps aside the problem of an intermittent, missing or unavailable telemetry communications link. In some embodiments, a given signal can be transmitted redundantly both by telemetry and by using the inground communications link. If both transmissions are successful, the most favorable route, at any given time, can be determined, for example, based on available bandwidth or manually specified. Furthermore, the arbitration of data can be mixed so that the system is not an all or nothing communication link.

For example, if both transmissions are successful, the system design can be configured to send certain types of data through the air and other data through the pipe for the purposes of optimizing the communication link of each system and enabling the best performance for the overall solution. In one system embodiment, there is no requirement for above ground telemetry communication via telemetry signal 92. Accordingly, there is no requirement in the subject system embodiment for telemetry signal 96 from the drill rig. In some system embodiments, all data communication between the drill rig and other above ground components can take place using the inground communications link or loop such that the inground tool thereby serves as an intermediate relay for data that is originated by an above ground components such as, for example, locator 80. It should be appreciated in this regard, however, that the present discussions relating to detection of frac-out and/or cross-bore indicative conditions are not limited to any particular communications route or mode for purposes of data transfer. For example, all data communication can be by way of transmission from the inground tool to locator 80 and by telemetry from locator 80 to drill rig 14. Of course, such communication can be bidirectional. Irrespective of the path by which the depth or other signals arrive at the drill rig, the data can be logged and timestamped at console 42. Of course, the data can be recorded at any suitable location so long as it is accessible, as will be further discussed.

Figure 13:
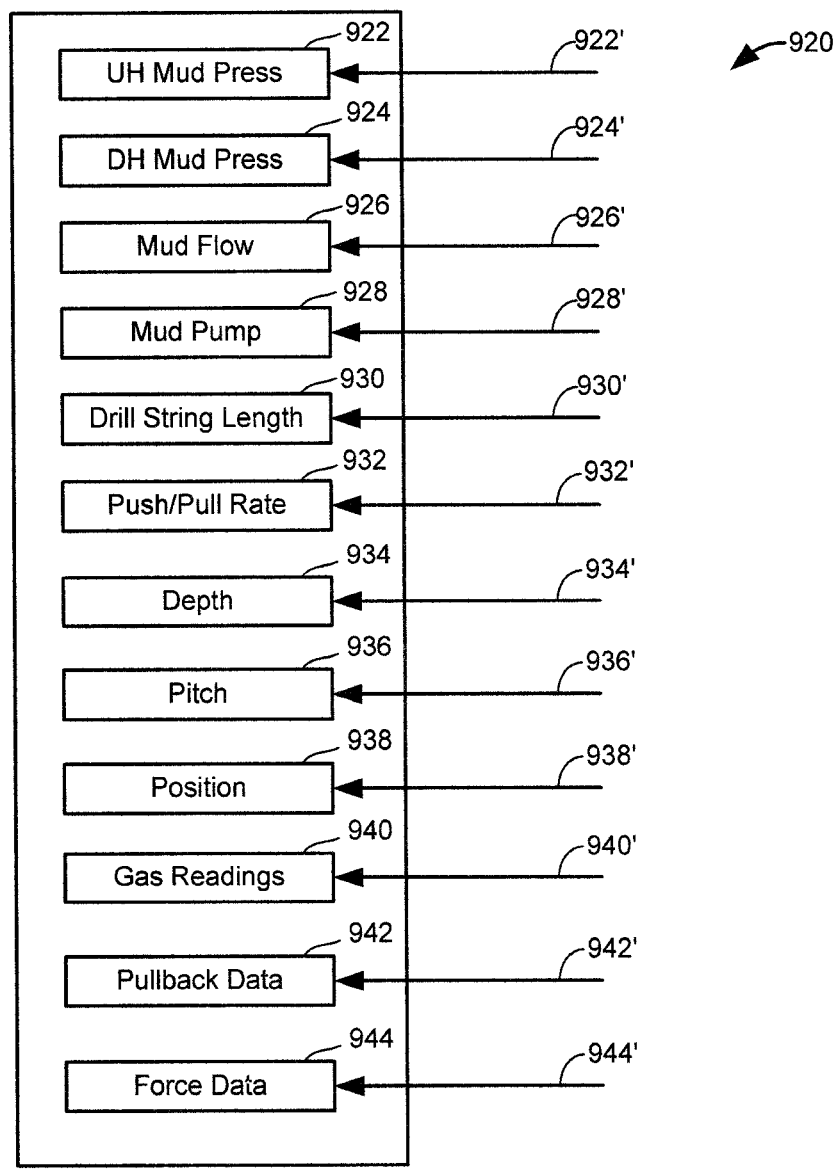
FIG. 13 is a block diagram illustrating an embodiment of a data structure for use in accordance with the methods and apparatus of the present disclosure.

Referring to FIG. 13, in conjunction with FIG. 12a, the former illustrates an embodiment of a data structure, generally indicated by the reference number 920, that can log any parameters of interest. This data structure can be stored and maintained, for example, in console 42 at the drill rig. In another embodiment, the data structure can be stored remotely, for example, in cloud storage either as primary storage and/or by way of backup. In still another example, the data structure can be stored in a portable device and/or in the inground tool. By way of non-limiting example, logged parameters can include uphole mud pressure 922, downhole mud pressure 924, mud flow 926, mud pump status 928, drill string length 930, drill string push/pull rate 932, depth 934, pitch 936, position 938, uphole and downhole gas detector readings 940, pullback data 942, force data 944 and any other parameter of interest that can be characterized either uphole, above ground, below ground and/or downhole. As will be further discussed, the force data can include the thrust force that the drill rig applies to the uphole end of the drill string as well as the bit force that the drill head applies to the soil responsive to the thrust force. It is noted that some of these parameters can be derived from incoming data using preprocessing in console 42, for example, based on joint processing of uphole and downhole data, prior to logging values. Of course, any base or fundamental signals, from which one or more other parameters can be derived, can likewise be logged for reference purposes. As seen in FIG. 13 each incoming parameter can be associated with an input that is designated using the same reference number with an appended prime mark.

Figure 14A:
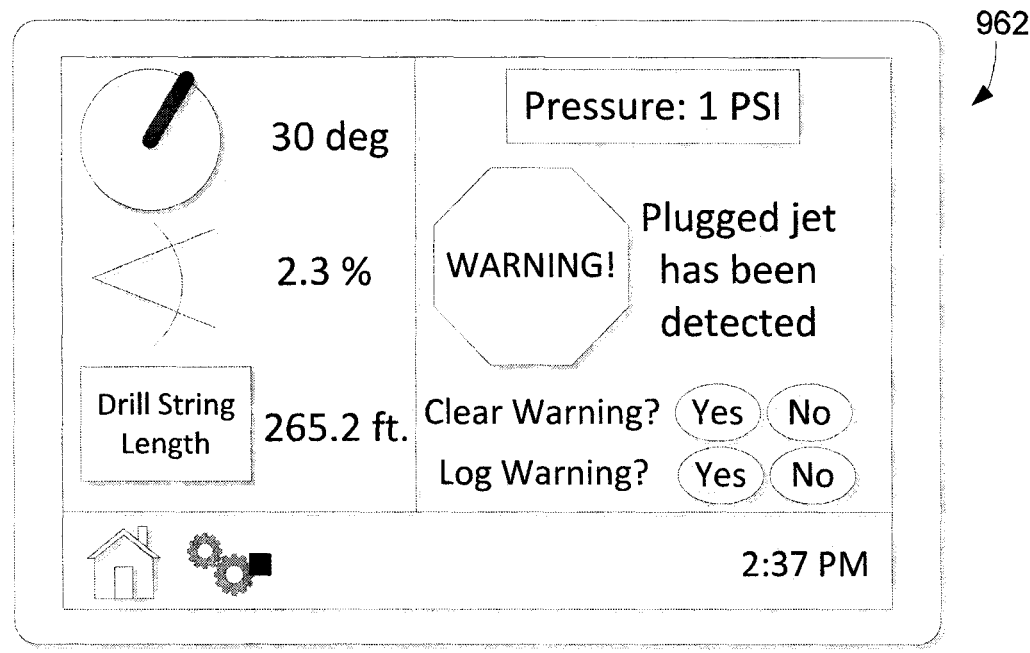
FIGS. 14a-14c are screenshots that illustrate embodiments of the appearance of operator notifications that can be presented based on methods described herein.

Turning again to the flow diagram of FIG. 12a, subsequent to step 906, operation proceeds to step 950 which determines the current uphole mud pressure, for example, as most recently measured by sensor 31 of FIG. 1. In an embodiment, the current uphole mud pressure can be compared to an uphole threshold pressure. If the uphole mud pressure is below the threshold value, the step is repeated in a loop fashion. The uphole mud pressure threshold can be based, for example, on soil and formation type, the size of drill head jet in use and/or the flow requirements of a given mud motor that is in use downhole. With regard to the latter, a mud motor can be used to provide downhole rotation of an inground drill bit as an alternative to rotating the entire drill string to cause rotation of the drill bit. Such a mud motor is powered by mud pressure and flow rate to produce rotational torque. It should be appreciated that there may be no uphole mud pressure at certain times for a number of reasons such as, for example, as a result of adding or removing a drill pipe section from the drill string. If uphole mud pressure is detected at or above the threshold, operation proceeds to step 952 which tests the current downhole mud pressure. In an embodiment, the current downhole mud pressure can be compared to a downhole mud pressure threshold. The downhole mud pressure threshold can be based, for example, on the pressure ratings of downhole tooling, electronics housings, soil and formation type, depth and distance from the drill rig, mud weight, density and viscosity of the spoil (i.e., the combination of cuttings and drilling fluid that travels upward around the drill string). If the current downhole mud pressure is above the threshold, operation can return to step 950. On the other hand, if the current downhole mud pressure is below the threshold, operation can proceed to step 956 which can test the current flow rate, for example, against a threshold flow rate. The flow rate threshold can be based, for example, on mud motor or drill bit requirements which relate to the advance rate and borehole diameter. A value of flow rate that is below the threshold branches operation to 960 and can issue an indication that the operator should check for plugged jets on the drill head or some sort of flow obstruction in the drill string. The indication can be aural and/or visual, for example, on one or both of the drill string console and portable device 80. If the determination associated with step 960 is made at drill rig console 42, the indication can be transmitted to portable device 80 using telemetry signal 96 and/or using the inground communications loop that comprises transmission down the drill string to downhole electronics 500 which can then transmit the indication to portable device 80 via signal 66. In this regard, it should be appreciated that bidirectional communication is provided by either one of these paths and that, when one path may not be available, the other may be available. FIG. 14a is an embodiment of a screen shot, generally indicated by the reference number 962 that can indicate the appearance of display 44 on the drill rig and/or display 86 on the portable device including the plugged jet indication. In an embodiment, operation of the drill rig can automatically be suspended until such time that the operator selects an input control to indicate that the mud flow problem has been resolved. Monitoring, of course, can then continue. In the present embodiment, the operator can select to clear the warning and/or to log the warning, although these various options can be embodied in a wide variety of different ways. Any information of interest can be presented in conjunction with the warning including but not limited to the downhole mud pressure, the pitch and the drill string length.

Figure 14B:
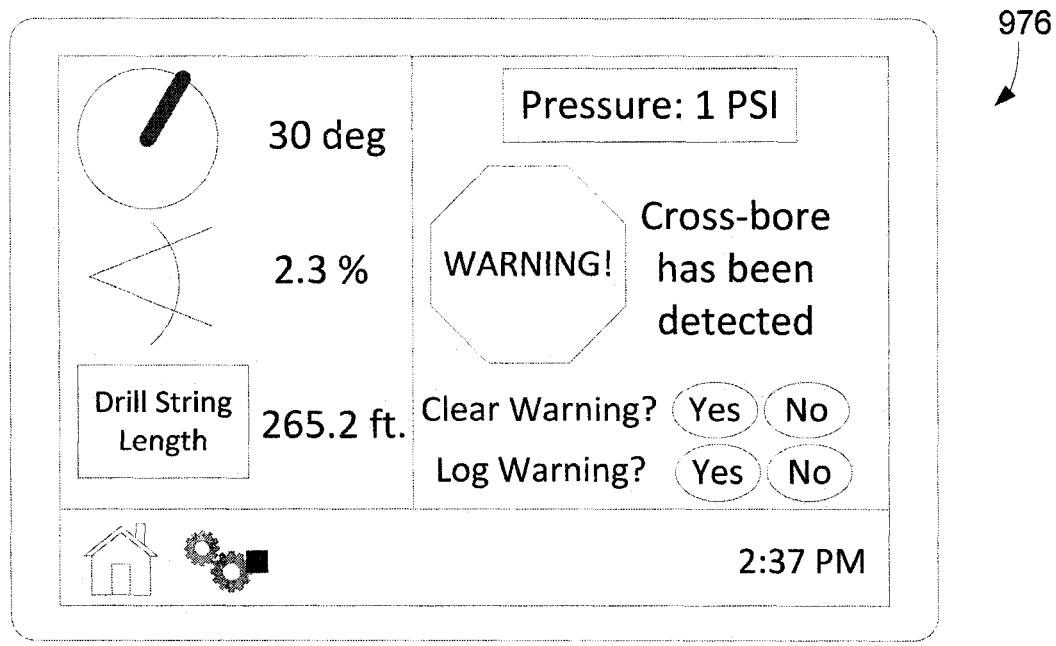
Figure 14C:
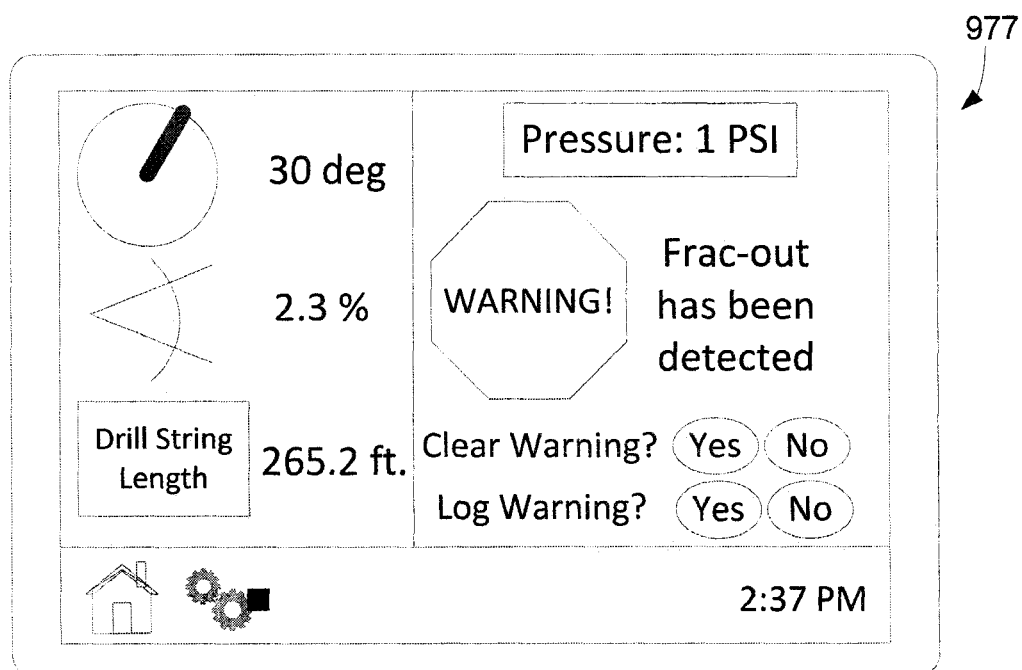

In the event that step 956 detects that mud flow is above the mud flow threshold, operation proceeds to a data correlation step 970. This step can be configured according to a wide variety of embodiments or can be optional in one embodiment. In another embodiment, the data correlation step can collect data from various sources that bear a relationship to the current operational situation such as, for example, being indicative of a frac-out or cross-bore. For example, data can be retrieved from data structure 920 of FIG. 13 that is indicative of an initial detection of the potential frac-out or cross-bore, responsive to steps 950, 952, and 956. The data that is collected can include uphole mud pressure, downhole mud pressure and mud flow. Supplemental data for these parameters can be collected from a time before and/or subsequent to the initial detection. Further, any additional data that is of interest can be collected corresponding to a selectable interval of time such as, for example, the length of the drill string and the rate of drill string push/pull. In an embodiment, the system can automatically determine and select the time interval. For example, the interval can be based on the first point in time at which downhole pressure initially drops in combination with a second point in time at which the annular pressure recovers. The automatically selected interval can include offsets such that the interval starts before the first point in time and ends after the second point in time. At 974, a warning can be issued to the operator of the drill rig and/or the operator of portable device 80 in visual form using appropriate displays and/or in aural form. FIG. 14*b* is a screenshot, generally indicated by the reference number 976, which diagrammatically indicates an embodiment of the appearance of a cross-bore warning while FIG. 14*c* is an embodiment of the appearance of a frac-out warning that is generally indicated by the reference number 977. In each case, operator selection options and displayed data can conform, by way of non-limiting example, to those presented in FIG. 14*a*, although each screen can be customized in any suitable manner. Various elements of the warning can include, by way of non-limiting example, any suitable combination or individual ones of aural elements, haptic elements and a graphical display of the current operational appearance and status of the drill string as well as the location of the potential problem that has been detected. In an embodiment, a plot of the annular downhole mud pressure versus drill string length can be presented, for example, based on a relevant portion of data 924 of FIG. 13. In this regard, one or both of screens 976 and 977 can provide an option to generate and display an appropriate plot. At 980, in an embodiment, operation can be suspended by the system operator, for example, in order to investigate the current circumstances that lead to the generation of the warning. In another embodiment, the operator may cancel the warning. In either case, operation can then proceed to step 984 that can save or transmit records, for example, that are generated by data correlation step 970 for reference and analysis purposes. In another embodiment, step 980 can automatically suspend operation of the drill rig. In addition to saving and transmitting data logs, the system can automatically initiate a recovery sequence that can be directed to generating further information relating to the potential downhole anomaly. Subsequent to suspension of operations, the method can then end at 990. In another embodiment, step 990 can provide for resuming normal operations responsive to a determination by the operator that the problem was resolved, for example, based on a pot hole or other suitable inspection.

Returning to the discussion of step 980, so long as operation is not suspended, the system can continue monitoring at 994 by returning operation to step 950. In this way, data collection associated with the current event will continue with ongoing operation. Step 974 can maintain the warning which can be accompanied by updating the screenshots of FIGS. 14*b* and 14*c*.

With continuing reference to FIG. 12*a*, it should be appreciated that embodiments of data correlation step 970 can perform any suitable form of monitoring that is related to the ongoing operation of the system in addition to the foregoing descriptions and in any suitable combination. For example, one factor in distinguishing between a potential frac-out condition as compared to a potential cross-bore condition can be based on the rate of change in the downhole mud pressure over time as detected by step 952. In the instance of a cross-bore, the downhole mud pressure can exhibit a very rapid rate of decrease that results in a sudden pressure drop. This sudden decrease can be of brief duration based on the push or pull rate of the drill string in combination with the path width of the cross-bore and may not reasonably be detectable, at least from a practical standpoint, by the system operator. Subsequently, the downhole pressure can exhibit an opposite and rapid rate of increase after having passed through the cross-bore. Effectively, a negative-going pulse can be present in the downhole pressure. Monitoring via data correlation 970 can encompass any desired one of these pulse characteristics and/or combinations thereof. While the warning at 974 can be based on detecting the initial decrease in downhole pressure, in some embodiments, the warning can be customized on the basis of some number of characteristics that conform to encountering a cross-bore via detection of the various portions of the negative downhole pressure pulse, as well as other factors yet to be described. In such a case, the warning at step 974 can indicate a likelihood of a cross-bore based on the degree that the detected pressure changes conform to an expected or predetermined pressure profile.

In another aspect or embodiment, data correlation step 970 can monitor for an increase in downhole pressure to levels that can be indicative or predictive of a potential frac-out. For example, a baseline downhole pressure can be developed on a per drill rod basis. If the downhole pressure exhibits an increase above an upper limit downhole pressure that is based on the baseline downhole pressure, warning 974 can be customized to indicate that there is a potential for causing a frac-out responsive to high downhole pressure. In some cases, the rate of increase in downhole pressure, at least as it crosses the upper limit, can form the basis of an increase in the urgency of the appearance of the warning that is provided to the operator. In an embodiment, system operation can automatically be suspended responsive to crossing the upper limit to at least allow the downhole pressure to decrease to a value that is below the upper limit. In another embodiment, system operation can be suspended responsive to the rate of change in downhole pressure as the upper limit is approached and/or exceeded.

FIG. 15*a* comprises a diagrammatic illustration of various parameters plotted against time and in vertical alignment for purposes of illustrating particular operational conditions. A plot 1000 shows drill string length s versus time while a plot 1004 shows the status of the drill string in terms of whether it is being advanced or retracted. For illustrative purposes, it has been assumed that the inground operation is forming a pilot bore, although this is not required, through advancing the drill string by one pipe section at a time in a series of spaced apart time intervals from $t_1$ to $t_2$, $t_3$ to $t_4$, $t_5$ to $t_6$, $t_7$ to $t_8$, and starting at $t_9$ in an interval that is only partially shown. Because it is assumed that the drill string is advanced at a uniform rate during each advancement interval 1006*a*-1006*e*, although this is not required, length s of the drill string increases linearly during each advancement interval and remains at a fixed value between the advancement intervals at which time various operations can be performed such as, for example, adding a new drill pipe to the above ground end of the drill string at the drill rig. As is the case with other plots shown, the advancement intervals are shown as being equally spaced apart in time although this is not required. Mud pump status plot 1010 indicates when mud pump 32 (FIG. 1) is operating in a series of spaced apart pumping intervals 1012a-1012e to provide uphole mud pressure. The latter is shown in plot 1020 that exhibits a series of uphole mud pressure pulses 1024a-1024e corresponding to the operation of the mud pump. Generally, the amplitude of these pressure pulses can be specified over a wide range of available operational values that can be selected, for example, based on soil type. By way of example, a relatively low pressure such as 300 psi, as measured by the uphole system, can be used in sandy soil with the inground tool configured to deliver a relatively high volume of drilling mud, for example, by using relatively large jets on the inground tool. While 300 psi may be a relatively low pressure in terms of drilling systems, it is nevertheless representative of a lower limit of what is considered as an overall high pressure range. In contrast, for a predominantly clay soil, the mud pressure can be set at the upper limit of the pressure capability of the mud pump such as, for example, 1300 psi while using relatively smaller jets. In either case and at intermediate operational points, large volumes of drilling fluid can quickly be delivered into the ground such that this delivery, when the inground tool is stationary can be problematic, in terms of producing a frac-out. In some embodiments, another downhole mud pressure sensor can be employed to sense the pressure internal to the drill string proximate to its inground end. Such a measurement can be used, for example, to detect that one of the drill pipe joints has loosened or disconnected.

Still referring to FIG. 15a, a plot 1040 diagrammatically illustrates downhole mud pressure versus time corresponding to uphole mud pressure 1020 whereby a series of downhole mud pressure pulses is indicated by the reference numbers 1042a-1042e. Pulses 1042a, 1042b and 1042d are representative of normal conditions such as during drilling. Because drilling mud is typically thixotropic, becoming fluid when disturbed or pumped but returning to a gel state when allowed to stand, initiation of pumping typically results in an initial downhole pressure rise 1046 (one of which is indicated) as the drilling mud begins to flow. In an embodiment, this peak value can be detected as a baseline upper pressure limit for the downhole mud pressure.

During normal operation, downhole mud pressure can exhibit a hydrostatic pressure 1047, several instances of which are designated, that is typically seen between downhole mud pressure pumping intervals. The hydrostatic pressure is based on the specific gravity q of the drilling fluid, acceleration g due to the force of gravity and a vertical distance h, between the drill rig and the inground tool, resulting in the expression:

$$\text{Hydrostatic pressure} = qgh \qquad (1)$$

Accordingly, a minimum threshold for downhole mud pressure, for example, in an embodiment of step 952 of FIG. 12a, can be based on the hydrostatic pressure.

As discussed above, data correlation step 970 of FIG. 12a can provide a warning or notification if a baseline upper pressure limit for downhole mud pressure is exceeded. By way of example, a peak pressure 1048 is indicated using a dashed line, as a different form of downhole mud pressure pulse 1042c. As discussed above, over-pressure conditions such as exemplified by peak pressure 1048 can result in a frac-out, particularly when the inground tool is stationary. Irrespective of the shape of pulse 1042c, a frac-out 1050 is illustrated as having occurred at the end of the pulse. Generally, either a frac-out or encountering a cross-bore can correspond to a drop in pressure below a normal operational plateau 1054 that can form a portion of each downhole mud pressure pulse. The frac-out can be characterized by a premature drop from plateau 1054 as well as a relatively gradual rate in the premature pressure drop. By way of example, a pressure drop 1056, as part of pulse 1042e, corresponds to a crossbore which is characterized by a rapid pressure drop and rate of pressure change, as will be further described.

In an embodiment of step 970 of FIG. 12a, a rate of change in the downhole mud pressure, once the pressure drops, for example, below plateau 1054 can be used as at least part of distinguishing between a potential frac-out and a potential cross bore. Even though the transit time through a cross-bore can be brief, the drop in the downhole mud pressure is generally dramatic such as, for example, a rate of decrease of minus 50 psi per second. In an embodiment, a threshold value can be used for purposes of distinguishing between a potential frac-out and a potential cross-bore. By way of non-limiting example, the threshold value can be selected in the range from −20 psi/sec to −100 psi/sec. In another embodiment, which can be combined with other embodiments, operational conditions that are indicative of a cross-bore include satisfying steps 950, 952 and 956 of FIG. 12a in conjunction with movement of the drill string, for example, as indicated by footage counter 28 of FIG. 1. The result of this logical equation/expression can be monitored by step 970 of FIG. 12a. In this regard, it should be appreciated that the drill string is advanced, in the present example, starting at $t_9$ in drill string length plot 1000, however, the use of this expression is equally applicable during retraction of the drill string, for example, during a back-reaming operation for purposes of installing a utility.

Another potential characteristic of a cross-bore can reside in a recovery 1060, which is indicated as a dashed extension of downhole mud pressure plot 1040. Initially, the downhole fluid pressure drops toward the pressure that is present in the cross-bore such as, for example, the pressure that is present in a sewer pipe pressure by way of non-limiting example. Given sufficient time, the downhole fluid pressure can match the pressure that is present in the cross-bore. Since it may take only seconds to drill through and past a sewer pipe, it is unlikely that the operator would be able to stop the drill in time to prevent the transit through the pipe. The slope of recovery 1060 can be steep. Subsequent to the transit during recovery 1060, however, at least some of the drilling mud will likely travel back to the cross-bore in the annular region around the drill string or utility being pulled back which contributes to limiting the magnitude of the pressure recovery. Thus, the initial rise or step-up in the recovery, as seen in FIG. 15a, will likely be lower than the downhole mud pressure prior to encountering the cross-bore. A transit interval I through the cross-bore can be brief based on factors including drill string advance/retract rate, the diameter of the cross-bore and the angle of incidence with the cross-bore. Generally, a rapid recovery in downhole mud pressure will not be exhibited by a frac-out. In an embodiment, step 970 can monitor for recovery 1060 as part of distinguishing between potential frac-out and cross-bore conditions. It should be appreciated that interval I can correspond to a data collection interval, as described above, with endpoints established to encompass an entire event of interest.

Figure 12B:
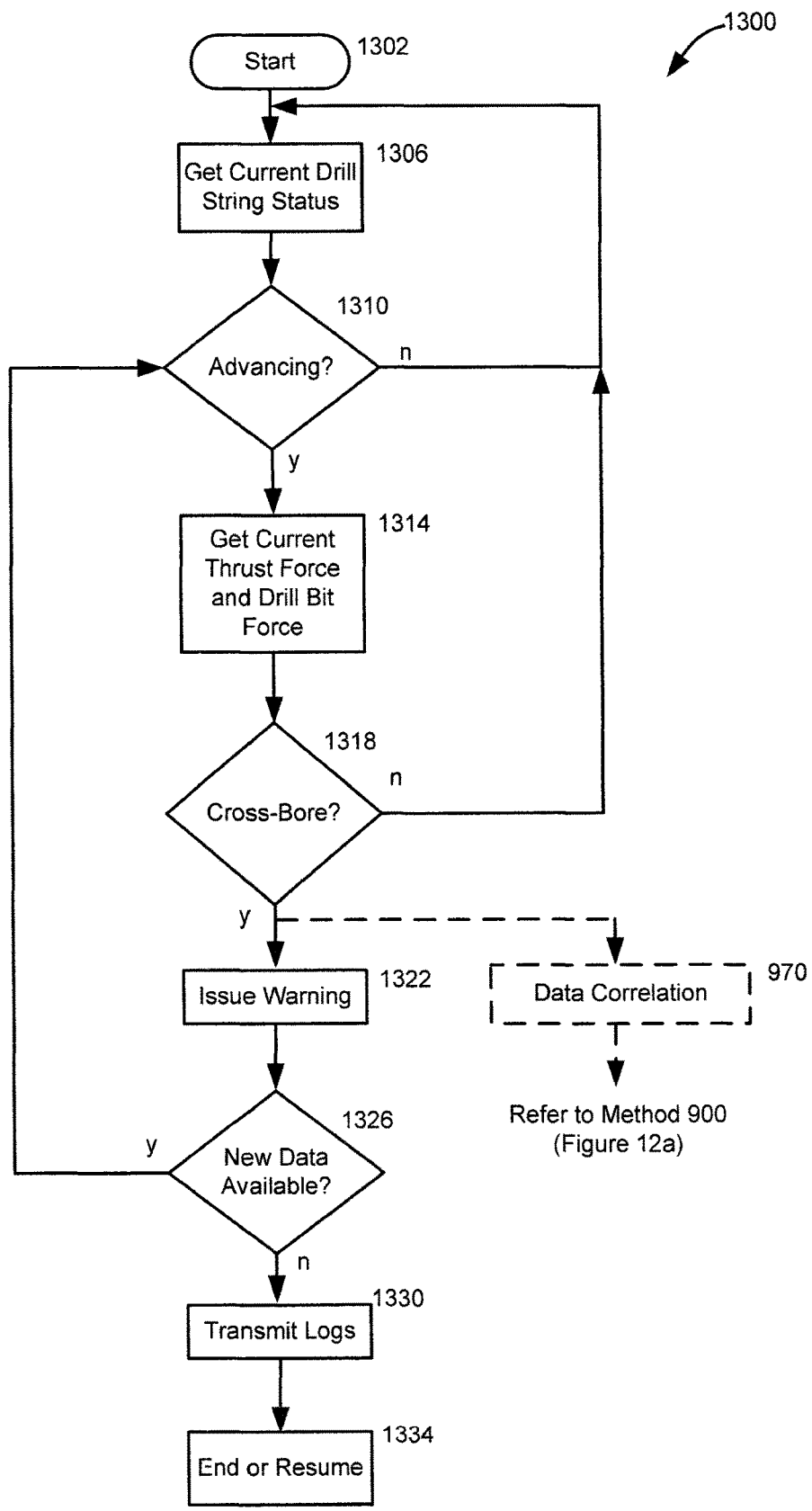
FIG. 12b is another flow diagram that illustrates an embodiment of a method for monitoring various combinations of data from drill rig based and downhole based sensors to provide for detection of encountering a crossbore.

Referring to FIG. 12b, attention is now directed to an embodiment of a method, generally indicated by the reference number 1300 for detecting a cross-bore based on various forces that can be monitored during the formation of a pilot bore. As described above, force sensor 529 can sense drill bit force which can be recorded, for example, as part of force data 944 in the data structure of FIG. 13. Force data 944 can also include thrust force that is a measurement of the force that is applied to the uphole end of the drill string by the drill rig as the drill string is driven into the ground. Various approaches can be used for purposes of measuring the thrust force such as, for example, on the basis of hydraulic pressure. Each form of force data can be correlated with the drill string length, as recorded. The method begins at 1302 and proceeds to step 1306 which obtains the current drill string status, for example, from the most recent value of push/pull rate data 932 in FIG. 13. At 1310, it is determined whether the drill string is advancing. If not operation returns to 1306 for monitoring in a loop fashion. If, on the other hand, the drill string is advancing, operation moves to 1314 which obtains the current or most recently updated values for the thrust force being applied by the drill rig and the drill bit force. At 1318, a comparison of the thrust force versus the bit force is made. This comparison can be based, for example, on a threshold difference. The latter value can be determined in any suitable manner, including empirically. It should be appreciated that the thrust force applied to the drill string from the drill rig is always higher than the bit force. The loss in the force transmission can be due to friction, borehole geometry and applied torque, in the event that spiral buckling occurs. Even in a homogeneous soil formation, the bit force measurement can exhibit a large fluctuation, for example, on the order of as much as 30%, when the drill string is advancing with the bit rotating. However, as soon as the drill bit enters a void, such as cross-bore, the bit force will rapidly drop to near zero. In some cases, the bit force can be low while drilling. For example, if the formation is sandy soil under the water table, the bit force can be very small. Proper drilling practice, however, calls for using higher viscosity mud with low jet pressure, thus not creating a substantial void in front of the drill tool. Accordingly, a cross-bore can still be detected on the basis of bit force. In an embodiment of step 1318, the threshold can involve detecting a rapid decrease in bit force over time. By way of non-limiting example, if the bit force drops down to less than 10 lbs in less than 0.1 sec, while the bit is moving forward in homogeneous soil, the drill bit has encountered a void such as a cross-bore.

If the threshold difference is not violated, operation returns to 1306. If the threshold difference is exceeded, operation proceeds to 1322 which can issue a warning to the operator. Of course, an initial detection of a potential cross-bore can initiate a data collection interval as well as logging, remote indications and activities that reflect the discussions which appear throughout this overall disclosure. In this regard, the bit force data can indicate an interval in which there is essentially no bit force as the drill head transits through a cross-bore with the bit force rising sharply at the end of this interval. Step 1322 can monitor for evidence of such a recovery in bit force. In an embodiment, operation can be routed, for example and as indicated in phantom using dashed lines, to data correlation step 970 of method 900. In this way, determinations made by method 1300 can be cross-correlated, for example, with pressures being monitored by method 900 such that the confidence level in detecting a cross-bore can be enhanced. As a non-limiting example, uphole mud pressure can be monitored in conjunction with the advance rate of the drill string. If the uphole mud pressure is constant with the drill string moving forward in homogeneous soil at a time when the bit force drops effectively to zero, the circumstances are indicative of encountering a cross-bore or void. In this regard, it should be appreciated that an abrupt increase in the uphole mud pressure can produce a void ahead of the drill bit that can reduce bit force.

In method 1300, subsequent to 1322, operation can move to step 1326 which determines if the operation is ongoing and new data is available. If so, operation can return to step 1310. Otherwise, operation can move to 1330 where activity such as, for example, transmitting logs or any activity that is deemed to be of interest, can be performed. The method can end at 1334 or be suspended to resume as needed. It should be appreciated that method 1300 can operate independent of method 900 of FIG. 12a, in parallel therewith or in a way that provides additional inputs to method 900.

FIG. 15b is a diagrammatic plot representing a further enlarged portion of certain plots taken from FIG. 15a and starting from time $t_8$. Downhole mud pressure 1040, drill string advance/retract 1004 and drill string length 1000 are shown in time relation to drill rig thrust force 1340 and bit force 1344. At $t_9$, the drill string is advanced which produces drill rig thrust force 1348 and a responsive increase 1350 in bit force. A substantial drop in bit force is seen, however, at 1354, responsive to encountering the cross-bore with a related, but much less pronounced drop 1356 in drill rig thrust force. Recovery 1060 in the downhole mud pressure, after transiting the cross-bore, is reflected by a pronounced recovery in bit force at 1360 with a step-up 1362 in the drill rig thrust force. Thus, a negative-going pulse is evidenced in the bit force. As described above, method 1300 can monitor any one of these various shapes in the bit force, any combination of these shapes or all of these shapes in the bit force which can evidence a cross-bore. Further, cross-correlation with other factors such as downhole mud pressure can be of value.

Attention is now directed to FIG. 16 which is a diagrammatic, further enlarged view of the distal inground end of the drill string 16 and boring tool 54 taken from FIG. 1, shown here to serve as a framework for the discussion of an integrated pitch technique. Applicants recognize that the depth of the boring tool is influenced in a direct way by the pitch orientation as the boring tool is advanced. In the prior art, depth determinations are generally based on pitch measurements that are taken at positions which correspond to the opposing ends of each drill pipe section. That is, Applicants are not aware of any prior art technique that relies on pitch orientations taken at intermediate positions along the length of each drill rod as the drill string is advanced. In accordance with the integrated depth technique that is brought to light herein, pitch readings can be taken at a plurality of positions along the length of each drill pipe section. In FIG. 16, each dot 1400a-1400p is representative of a position and corresponding pitch reading or value that is measured responsive to advance of the drill string. For each pitch value, the system determines a corresponding length of the drill string as an output provided by footage counter 28 at the drill rig. It should be appreciated that the footage counter can be capable of determining the length of the drill string with a high degree of accuracy, for example, at least within one-quarter of an inch. For a nominal drill rod length of 20 feet with a pitch determination interval of 2 inches, 120 pitch values can be measured. Since bending of typical drill pipe over a distance as short as 2 inches is most often negligible, it can be assumed that the boring tool has advanced along a straight segment $\Delta s_i$ corresponding to each pitch value $\phi_i$ where the variable i is an index value for the pitch measurement intervals. As the number of pitch measurements i increases for a given drill rod length, the depth determination accuracy can correspondingly increase and approach the integrated value of the depth. An inset view 1420, shown within a dashed circle in FIG. 16, illustrates an x axis that generally corresponds to a horizontal forward direction along the drilling direction and a z axis that is positive in a vertical, downward direction for characterizing depth d. Thus, for a given incremental pitch determination $\phi_i$ corresponding to an incremental advance $\Delta s_i$ in the drill string, the change in depth $\Delta d_i$ is given by the expression:

$$\Delta d_i = \Delta s_i \cos \phi_i \quad (2)$$

Of course, the total depth at any given time is equal to the current depth plus the incremental depth change which can be positive or negative. The current depth of the boring tool can therefore be determined with a high degree of accuracy. Based on the foregoing, the system can be optimized in ways that are intended to increase the number of pitch readings that can be transferred from the boring tool to the drill rig via the drill string and based on the measurement capabilities of footage counter 28. In an embodiment, the number of incremental pitch readings can be based, for example, on the throughput capability (i.e., bandwidth) of the drill string communication system that is established between the boring tool and the drill rig. Practical embodiments can use intervals that range from sub-Hertz to kHz. In this regard, there is no requirement to use a regular pitch measurement interval, as can be seen in FIG. 16. The pitch measurement interval can vary, for example, based on the current volume of data traffic on the drill string communication system. In some embodiments, the frequency of the incremental pitch measurements (i.e., between adjacent points 1400*a-p* in FIG. 16) can be based on the current pitch value. For example, if the pitch reading is near horizontal, the frequency of pitch measurement can be reduced whereas when the frequency can be increased in proportion to the amount of deviation from horizontal. In another embodiment, the rate of change in the pitch reading can be monitored such that the frequency of pitch measurements can be increased in proportion to an increasing rate of change in the pitch of the boring tool. Moreover, the incremental pitch readings and associated data can be automatically gathered. In some embodiments, the drill rig can automatically be momentarily paused when each incremental pitch reading is collected for purposes of noise mitigation of sensor data.

Referring to FIG. 17 in conjunction with FIG. 16, the former is a flow diagram, generally indicated by the reference number 1200, which illustrates an embodiment of a method for determining integrated depth in accordance with the present disclosure. The method begins at start 1204 and proceeds to 1208 which can receive a first pitch reading $\phi_i$, a current change in drill string length $\Delta s_i$, and a current depth value d as inputs. At 1212, the incremental depth change $\Delta d_i$ for the current increment i can be determined based on equation (1). At 1216, a determination is made as to whether another incremental pitch value $\phi_i$ is available. If so, operation proceeds to 1218 which receives associated inputs and then routes the procedure back to step 1212 to determine a new incremental depth change and updated current total depth. Once step 1216 determines that all of the incremental pitch readings have been processed, operation proceeds to step 1220 to output an integrated depth value and the process can conclude at 1224.

In another embodiment, the incremental pitch readings of FIG. 16 can be measured during pullback subsequent to drilling the length of each drill rod. In this way, the incremental pitch readings can be taken without being subject to noise and vibration levels that are present during the advance, or what is commonly referred to as the pilot bore, of the drill string. It should be appreciated that the pullback and incremental pitch reading process can be automated. Method 1200 can determine the integrated depth irrespective of the particular order in which the pitch readings are obtained at least for the reason that each incremental pitch measurement is associated with a unique length of the drill string. In some embodiments, pitch readings from the pilot bore operation can be combined with pitch readings obtained during pullback.

In still another embodiment, integrated lateral movement of an inground tool can be determined when the tool includes a yaw sensor such as, for example, magnetometer 522 of FIG. 10. That is, movement of the inground tool can be determined with respect to a y axis that is normal to the x-z plane that is shown in FIG. 16. Measurement positions 1400*a*-1400*p* would then represent yaw sensor readings along the length of the drill rod. It is considered that one of ordinary skill in the art can readily implement this embodiment with this overall disclosure in hand.

Attention is now directed to FIG. 18, which diagrammatically illustrates a pullback or back-reaming operation that is being performed in a region 1600, for example, using inground tool 20 of FIG. 9 in conjunction with drill rig 14 of FIG. 1. Portable device 80 (FIG. 1) and associated communication paths can be utilized, but the portable device has not been shown in FIG. 18 for purposes of illustrative clarity. The back-reaming operation is illustrated as having partially pulled a utility 1604, shown as a thick solid line, through a previously formed pilot bore 1608, which is shown as a dashed line. The latter passes below a body of water 1612 and leads to drill rig 14. During the illustrated back-reaming operation, however, what can be referred to as "key-holing" has occurred between points P1 and P2 along the pilot bore such that the drill string and, therefore, the utility have deviated from the original path of the pilot bore. Between point P1 and inground tool 20, the displaced or key-holed drill string is indicated by the reference number 1614 and is shown as a solid line. The utility will therefore be positioned above the original pilot bore between P1 and P2. Such drill string key-holing can problematically result in the drill string along portion 1614, the inground tool 20 and/or utility 1604 inadvertently coming into contact with a cross-bore 1620 or other inground obstacle, as shown. Of course, additional key-holing that takes place behind the inground tool at any given location along the pilot bore is not detectable since sensing is performed at the inground tool, however, the occurrence of such additional key-holing is less likely if no key-holing is detected at the inground tool during the ongoing pullback operation. Moreover, the upward forces that are applied to the soil by the utility during pullback are generally less than those applied by the drill string particularly when the operator takes well-known measures such as, for example, filling a utility with water to counteract its buoyancy. These upward forces will be described in detail immediately hereinafter.

Still referring to FIG. 18, attention is now directed to an analysis of factors that are attendant to the production of key-holing. A pull force T, indicated as an arrow, is applied by drill rig 14 to drill string 16 which is present in the pilot bore between inground tool 20 and the drill rig. Responsive to force T, a force $T_1$, indicated by an arrow, is applied to utility 1604 upon reaching a point $P_3$ while a force $T_0$, indicated by an arrow, is applied to the utility at the point where it enters the ground. While not illustrated, this entrance point, for example, can be in a pit to which the pilot bore originally extended. The utility is subject to a coefficient of friction μ in contact with the soil. For typical drilling mud which can be characterized, for example, as 60 second mud (as measured, for example, using a Marsh funnel), the coefficient of friction can be about 0.2 to 0.4. Where a differential path length ds is a product of a local radius and a corresponding differential arc length $d\theta$, the relationship between $T_0$ and $T_1$ can be expressed as:

$$T_1 = T_0 e^{\theta_2 \mu} \quad (3)$$

Where $\theta_2$ is an angle that is based on an at least approximated radius of the pilot bore from $P_3$ to $P_4$. The upward force between points $P_3$ and $P_4$ due to tension can be expressed as:

$$\int_0^{\theta_2} T_0 e^{\mu\theta} d\theta = \frac{T_0}{\mu}[e^{\mu\theta_2} - 1] \quad (4)$$

Where $\theta_1$ is an angle that is based on an at least approximated radius of the pilot bore from $P_5$ to $P_6$. When it is assumed that the utility being installed has a neutral buoyancy, the upward force between points $P_5$ and $P_6$ due to tension can be expressed as:

$$\int_0^{\theta_1} T_2 e^{\mu\theta} d\theta = \frac{T_2}{\mu}[e^{\mu\theta_1} - 1] \quad (5)$$

Where $T_2$, indicated by an arrow, is the tension at point $P_5$.

Based on the upward forces given by equations (4) and (5), if the upward force at a given location is distributed over an area defined by the drill string or utility that is applying the force, key-holing can occur wherever the applied force per unit area is greater than the compressive strength per unit area of the local soil formation.

In an embodiment, drill string key-holing can be detected based on comparing pilot hole pitch values, taken along the drill path, as the pilot hole is bored, to pullback pitch values taken as inground tool 20 is pulled back along the pilot bore during the back-reaming operation. In this regard, systems according to the present disclosure can produce orientation and other borepath related data at a rapid rate such as, for example, pitch sensor values 1400a-1400p, as seen in FIG. 16. It should be appreciated that pitch readings can be obtained at a comparable frequency by inground tool 20 during the back-reaming operation. As is demonstrated by FIG. 18, between points $P_1$ and $P_2$, pitch values taken along the pilot bore will fail to match pitch values taken during the back-reaming operation due to the drill string key-holing that is taking place. Thus, for any given length of drill string 16, obtained from footage counter 28 (FIG. 1), during the pull-back operation, a comparison can be made of the current pitch value at the inground tool during pullback to a corresponding pilot bore pitch value. For purposes of this comparison, a threshold pitch variation can be specified such that a warning can be issued whenever the difference, according to the comparison, exceeds the threshold. In an embodiment, the threshold pitch variation can be 1 degree or less. Based on the frequency of the pitch sensor values obtained during pullback by inground tool 20, real time monitoring can be provided, at least from a practical standpoint, since pitch readings on pilot bore formation and pullback can be spaced apart by a fraction of an inch. In an embodiment, the comparison can essentially be made on a real time basis as each pull-back pitch value is obtained.

In another embodiment, which can be used either independent of or in conjunction with the embodiment described above, the depth of inground tool 20 can be tracked during pullback using integration, for example, as described above with reference to FIG. 16. The depth at the current drill string length during pullback can be compared to recorded depth values for the pilot bore at the current drill string length for purposes of detecting drill string key-holing. Again, a difference between a recorded pilot bore depth and the current pullback depth can form the basis for a warning when a specified depth change threshold is met and/or exceeded. In an embodiment, this threshold can be 2 feet or less. In some embodiments, depth values that are measured along the bore path using a walkover locator, which can be referred to as "confidence points", can form part of the described comparison. Confidence point measurements can be taken at points as the pilot bore is formed and during pullback. In an embodiment, the system can prompt the operator during pullback to obtain a pullback confidence point measurement that corresponds to a pilot bore confidence point measurement for direct comparison purposes. In this regard, monitoring based on either pitch or depth can be automated for purposes of drill string key-holing detection during a pullback operation.

In still another embodiment, advanced systems can be used that can determine the actual position and/or orientation of the inground tool such as is described, for example, in U.S. Pat. No. 7,425,829 and in U.S. Pat. No. 8,381,836, each of which is incorporated herein by reference in its entirety. In other embodiments, the inground tool can include an Inertial Navigation System (INS) that can determine the position and/or orientation of the inground tool. In such embodiments, a recorded depth of the boring tool along the pilot bore can be compared to the depth of inground tool 20 during the pullback operation in a manner that is consistent with the descriptions above wherein a pitch comparison is made.

Referring to FIG. 19, an embodiment of a method for detecting drill string key-holing is generally indicated by the reference number 1700. The method begins at 1704 and proceeds to 1708 which retrieves pilot bore data that is of interest, for example, from data structure 920 of FIG. 13. At 1712, a current parameter value can be received during the pullback operation and can also be recorded as part of pullback data 942 in the data structure of FIG. 13. The current parameter can be selected as any of pitch, depth and position. In some embodiments, comparisons can be made with respect to more than one parameter. At 1716, the drill string length can be determined for the current parameter. At 1720, the current parameter is matched to a corresponding pilot bore parameter. In cases where recorded pilot bore parameters correspond to drill string lengths that fall on each side of the current drill string length, an extrapolated value can readily be determined for comparison purposes. At 1722, a determination is made as to whether the current parameter is within an acceptable range from the value of the corresponding pilot bore parameter. This determination can be based on a threshold that is established for each parameter to which the method is applied. By way of non-limiting example, a pitch threshold can be one degree or some determined lesser value, a depth threshold can be 6"-12" and a position threshold can be 6"-12". If the comparison at 1722 reveals that the current parameter is within limits, operation can return to step 1712 to receive an updated current parameter value as the pullback progresses. As discussed above, the comparative analysis is not limited to one parameter such that more than one type of parameter can simultaneously be subjected to method 1700.

Still describing FIG. 19, if the current parameter violates an associated threshold in step 1722, operation can proceed to step 1730 which can issue a notification or warning to the operator that drill string key-holing may be occurring at the current location of the inground tool. The drill string key-holing warning can be handled in a manner that is consistent with other types of warnings that have been described above. For example, logs can be recorded locally and/or remotely as well as recording the warning locally and/or transmitting the warning to a remote location. In an embodiment, data indexed to the length of the drill string can be graphically presented to the operator and/or at a remote location to illustrate the potential drill string key-holing. Operation can be suspended manually or automatically pending a determination by the operator or other authority that it is appropriate to resume the operation. Subsequent to step 1730, the method can end at 1732 but can be reinitiated, as needed. It should be appreciated that data transfer, for purposes of detecting drill-string key-holing, can be accomplished through the use of any suitable communication path and/or mode.

Referring again to FIG. 18, Applicants recognize that pullback data may often comprise a more accurate representation of the actual installed location of a utility than the pilot bore data. Accordingly, data for representing the utility in an as-built form can be produced from pullback data 942 of FIG. 13. In this regard, the prior art generally characterizes an installed utility in terms of the pilot bore data which can be very inaccurate when factors such as, for example, drill string key-holing come into play.

Referring to FIG. 1, during the formation of a pilot bore using system 10, there can be times when the operator chooses to engage in a repetitive movement of the drill string with selective actuations of the roll orientation accompanied by coordinated advancement and retraction of the drill string. This activity can be referred to as auto-carving and can be employed, by way of example, when attempting to achieve a particular pitch orientation of the drill head to follow a predetermined bore plan either manually or automatically.

Referring to FIG. 20, a diagrammatic illustration, generally indicated by the reference number 1800, is presented which represents rotation of a drill head or bit about an elongation axis 1804 that is defined by the drill head in what can be referred to as a path carving process. Such a process can be used when the compressive strength of the soil is so high that the drill rig, without rotating the drill string, is unable to push the drill head through the soil to accomplish steering. That is, the drill head cannot be advanced simply by pushing. The objective of path carving is to impart mechanical work to the borehole to provide a biased orientation of the drill head for steering purposes. Generally, a path carving process involves rotating the drill head through some limited range of rotation, a carving interval 1810 such as, for example, from position A to position B which is a range of 120 degrees, by way of non-limiting example, although any suitable carving interval angle can be used. While rotating, for example in the clockwise direction, the drill head is advanced some incremental distance that is generally less than or equal to the length of a drill pipe section. In some embodiments, the distance can be only a matter of inches. The drill head is then rotated in the same rotational direction from the ending roll position of the carving interval from position B back to starting roll position A of the carving interval in what can be referred to as an indexing interval 1814. In coordination with the indexing interval, and before rotating to the starting roll position of the carving interval, the drill string can be retracted by an amount, for example 3"-6", that is sufficient to allow separation of the drill bit with the undrilled face of the bore. The process can then be repeated, for example, manually by the operator until such time that it is terminated by the operator. Since auto-carving is often performed in hard soil and rock, the phenomenon of drill pipe wrap-up can occur which leads to unpredictable rotation of the drill head responsive to rotation of the drill string by the drill rig. When wrap-up is present, the drill head can effectively release to "snap" past a targeted roll position such as, for example, the beginning of the carving interval or entirely past the carving interval. To achieve the targeted roll position, it is then necessary to continuing rolling the drill string until the targeted roll position is achieved. It should be evident that path carving can be complicated in the absence of accurate and rapidly updated indications of the roll position of the drill head.

Attention is now directed to the flow diagram of FIG. 21 which illustrates an embodiment of an automated carving or "auto-carving" technique that is generally indicated by the reference number 2000. The method begins at start 2004 and moves to 2008 which initially reads various values, such as current values from data structure 920 of FIG. 13, generally while the drill head is stationary, including roll orientation, pitch orientation, yaw orientation, drill string length and bit force. The latter can be non-zero at the start of the process. If so, it should be relieved such that the drill head can roll freely in a manner that is consistent with the descriptions below. At 2012, the method obtains input parameters for purposes of defining the objectives of the auto-carving process. The values can be specified, for example, by the operator using console 42 (FIG. 1) at the drill rig although the parameters can be specified from any suitable location. Using FIG. 20, by way of non-limiting example, the various inputs can include an auto-carving range from position A to position B as well as a targeted pitch orientation T and/or a targeted yaw orientation and the number of iterations of the auto-carve process to be executed. In some embodiments, default values can be used for A and B, number of iterations, and/or other parameters. Other parameters can include, for example, push force and rotation rate. At 2016, the drill head is rotated to position A, clockwise in the present example. Rotation is only performed, as is traditionally the case, in the direction that tightens the pipe joints in the drill string. At 2020, the carving interval is performed from roll orientation position A to roll orientation position B while push force is applied to the drill string. Of course, drilling mud can be emitted as jets 52 (FIG. 1) during the carving interval although this is not required. Subsequent to the carving interval, at 2024, the drill string is retracted by an amount that is sufficient to relieve pressure against the face of the bore hole, for example, as indicated by bit force sensor 529. The amount of this retraction, as recognized by Applicants, can be limited to an amount that is just sufficient to provide for free or out of contact rotation of the drill head in the borehole for reasons yet to be described.

At 2028, the bit force is sensed to establish that pressure has been relieved against the face of the borehole which is typically associated with the ability to freely rotate the drill head out of contact with the face of the borehole or the drill behaves as if it is out of contact at least from a practical standpoint even though there could be incidental contact that is of no consequence to the process results. If the bit force is not relieved, step 2024 is repeated until test 2028 is satisfied. Subsequently, at 2032, the indexing interval is performed from roll position B back to roll position A. Rolling can automatically continue, for example, if drill pipe wrap-up causes the system to miss position A on any given rotation. At 2036, the sensors described with regard to step 2008 are read again for current data values. It is noted that appropriate data for purposes of step 2036 corresponds to any that is read outside of carving interval 1810, for example, when the drill head is stationary, rotating out of contact (i.e., rotating freely) and/or retracting. In this way, data accuracy is not compromised by vibration and unpredictable accelerations that can be present during the carving interval. At 2040, current parameters and data can be compared against target values from step 2012. If it is determined that the target parameters have been achieved, operation can proceed to 2044 which can indicate that the process has been completed according to the prescribed targets and the process ends at 2048. On the other hand, if 2040 determines that the targets have not been achieved, operation moves to 2052 which can perform an analysis of the process parameters, for example, based on the targeted values as compared to accumulated data from one or more iterations but at least including the current iteration. At 2056, if the analysis determines that the accumulated iteration data as well as the current iteration data is progressively approaching the targets and another iteration is available per the target number of iterations, operation can return to 2016. If the analysis determines that the data for the current iteration is beginning to diverge from the target values, operation can proceed to step 2044 which provides a notification that the carving process should be terminated at least according to the presently specified target parameters. In some cases, the analysis can rely at least to some extent on accumulated iteration data in conjunction with the current iteration data. In an embodiment, step 2052 can determine that the soil conditions are allowing progress in a particular direction that is other than the target direction or yaw angle. In this case, operation can proceed to step 2044 wherein the notification can apprise the operator of the available or alternative direction of progress and, in an embodiment, offer a revised target T and/or endpoints A and B for approval and/or modification to be performed during a new set of iterations. The operation can then resume from step 2056.

The analysis at step 2052 is premised on obtaining sensor and parameter inputs from step 2036 that accurately represent ongoing progress during the auto-carve iterations. It should be appreciated that excessive retraction of the drill string between carving intervals can produce at least two adverse consequences. The first adverse consequence resides in obtaining sensor and parameter values that do not appropriately represent the progress or lack thereof associated with the specified auto-carving targets. Accordingly, the process could be prematurely terminated when, in fact, it was on track to produce a targeted outcome. Relatedly, there is a risk in continuing to perform iterations when the sensor data should indicate that the process is progressively diverging from the targeted values with ongoing iterations. The second adverse consequence resides in effectively wiping out actual progress that has been made toward the target values as a result of excessive retraction. For example, if it is desired to produce a positive increase in the pitch value, the influence of gravity in combination with excessive retraction can easily negate a previously achieved positive increase in pitch. These adverse consequences can be significantly limited or swept aside altogether, however, through the use of bit force data by steps 2024 and 2028 such that retraction of the drill head is limited at least approximately to a distance that is just enough to relieve the bit pressure against the borehole face. In this way, the amount of change in orientation of the drill head responsive to the retraction can be limited in a way that continues to provide for accurate sensor readings.

Referring to FIG. 16, in conjunction with FIG. 1, system 10 sweeps aside limitations with respect to the need for rapid roll orientation updates since roll orientation updates can be provided as often as the pitch orientation updates for positions 1400a-1400p in FIG. 16. The latter updates, as described, can be provided corresponding to less than one inch of movement of the inground tool. In terms of stationary rotation of the drill head, roll orientation updates can be provided at least as often, for example, as every 0.1 seconds which can correspond to a known amount of drill head rotation depending on the rate of rotation employed by the drill rig operator, or the rate programmed for automation purposes. In an embodiment, auto-carving can invoke an additional allocation of drill string communication bandwidth to roll orientation updates. In this regard, this allocation can be coordinated with monitoring for a stationary status (i.e., no lateral movement) of the drill head such that even the bandwidth that is typically allocated to pitch orientation updates can be reallocated to roll orientation updates at these times.

The techniques brought to light by the present disclosure represent various combinations of data that are derived or produced by uphole data sources and downhole data sources. These various combinations of data, when subjected to appropriate analysis, can result in establishing indications upon which appropriate responses can be initiated in accordance with the teachings herein. In some embodiments, the combined data can enhance capabilities with respect to tracking the position of an inground tool. For example, the disclosed integrated depth technique employs pitch information derived from a downhole pitch sensor in combination with drill string length derived from a footage counter at the drill rig to more accurately characterize the depth of the boring tool. The disclosed integrated lateral movement technique employs yaw information derived from a downhole yaw sensor combination with drill string length derived from a footage counter at the drill rig to more accurately characterize the lateral position of the inground tool. In other embodiments, the combined data can enhance monitoring and management with respect to the detection of adverse operational conditions. For example, embodiments of frac-out and cross-bore detection techniques can utilize, for example, uphole determined parameters including uphole mud pressure, footage counter data characterizing drill string length and movement and mud flow data in combination with downhole data including, for example, downhole annular mud pressure to establish indications responsive to which the system and/or operator can take additional actions. In another embodiment, either independently or in combination with the previous embodiment, cross-bore detection can be based on uphole data including drill string push status and drill rig thrust force in combination with downhole data that includes, for example, bit force to detect an encounter with a potential cross-bore to form the basis for subsequent response thereto. In still another embodiment, drill string key-holing can be detected on the basis of correlating downhole information to both formation of a pilot bore and to pullback as indexed by drill string length as established using an uphole footage counter. Accordingly, the described techniques can provide for improving tracking accuracy and reducing traditional risks associated with the installation of inground utilities by monitoring and analyzing various combinations of drill rig derived data and downhole data in ways that have heretofore been unknown.

The foregoing description of the invention has been presented for purposes of illustration and description. It is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. A method for use in conjunction with a horizontal directional drilling system during an inground operation including a pull-back operation in which a drill string is retracted by a drill rig to pull a utility at least generally along a pilot bore such that key-holing can take place wherein the utility is inadvertently displaced above an initial path of the pilot bore, said method comprising:
forming the pilot bore by advancing a boring tool through the ground responsive to extension of the drill string from the drill rig while measuring a length of the drill string extending from the drill rig to the boring tool;
as the boring tool is advanced, recording at least one parameter that characterizes the pilot bore at a series of positions along the pilot bore indexed against the measured length of the pilot bore for each one of the series of positions;
after forming the pilot bore, attaching a pull-back tool to a distal end of the drill string and attaching the utility to the pull-back tool;
retracting the drill string, during a pull-back operation, to pull the pull-back tool and the utility toward the drill rig at least generally along the pilot bore while measuring the length of the drill string extending from the drill rig to the pull-back tool;
characterizing at least a current value of said parameter during the retraction indexed against the measured length of the drill string;
comparing the current value of the parameter, at a current location of the pull-back tool and obtained during the pull-back operation to a recorded value of the parameter taken during formation of the pilot bore and corresponding to the current location; and
based on a deviation of the current value from the recorded value of the parameter, initiating a response to drill string key-holing at least potentially occurring.

2. The method of claim 1 wherein characterizing the current value of the parameter during the retraction includes sensing a different parameter during the retraction and generating the current value of the parameter based on a sensed value of the different parameter.

3. The method of claim 2 wherein said parameter is a depth of the inground and the different parameter is pitch orientation of the inground tool during the pull-back operation.

4. The method of claim 1 wherein initiating said response includes issuing a notification that drill string key-holing is at least potentially occurring.

5. The method of claim 1 wherein initiating said response includes suspending operation of the drill rig.

6. The method of claim 1 wherein the parameter is pitch orientation and said comparing compares a difference between the current and recorded values of the pitch orientation to a threshold pitch variation to initiate said response whenever the difference exceeds the threshold pitch variation.

7. The method of claim 6 wherein the threshold pitch variation is 1 degree.

8. The method of claim 1, further comprising:
repeating said comparing essentially in real time as the current position of the pull-back tool progresses toward the drill rig at least generally along the pilot bore.

9. The method of claim 1 wherein the parameter is a depth and said comparing compares a difference between the current and recorded values of the depth to a depth change threshold to initiate said response when the difference exceeds the depth change threshold.

10. The method of claim 9 wherein the depth change threshold is in a range from 6 to 12 inches.

11. The method of claim 1 wherein the drill string extends from the drill rig to the pull-back tool for performing the pull-back operation to move the pull-back tool through the ground which movement is characterized, at least in part, by a pitch orientation of the pull-back tool, said method further comprising:
during the pull-back operation, measuring a series of incremental movements of the inground tool based on the length of the drill string;
establishing the pitch orientation of the pull-back tool that is associated with each incremental movement;
determining an incremental depth change in the depth of the pull-back tool for each incremental movement serving as a pitch measurement interval; and
summing the incremental depth changes as part of determining the current depth of the pull-back tool at the current location.

12. The method of claim 1, further comprising:
during forming the pilot bore, obtaining at least one pilot bore confidence point depth reading; and
during the pull-back operation, prompting an operator of the system to obtain at least one corresponding pull-back confidence point depth reading for comparison to the pilot bore confidence point depth reading.

13. The method of claim 12 wherein the pilot bore confidence point depth reading and the corresponding pull-back confidence point depth reading are obtained using a walkover locator.

14. The method of claim 1 wherein the parameter is a position of the boring tool and the pull-back tool.

15. An apparatus for use in conjunction with a horizontal directional drilling system during an inground operation including a pull-back operation in which a drill string is retracted by a drill rig to pull a utility at least generally along a pilot bore such that key-holing can take place wherein the utility is inadvertently displaced above an initial path of the pilot bore, said apparatus comprising:
a drill rig monitor for measuring the length of the drill string (i) during formation of the pilot bore by advancing a boring tool through the ground responsive to extension of the drill string from the drill rig while measuring the length of the drill string and (ii) during the pull-back operation to install the utility in the ground; and
a controller that is configured for
recording at least one parameter during the formation of the pilot bore that characterizes the pilot bore indexed against the measured length,
characterizing at least said parameter at a pull-back tool as the drill string is retracted, during a pull-back operation, to pull the pull-back tool and the utility toward the drill rig at least generally along the pilot bore indexed against the measured length of the drill string, comparing a current value of the parameter during the pull-back operation to a recorded value of the parameter, and based on a deviation of the current value from the recorded value of the parameter, initiating a response to drill string key-holing at least potentially occurring.

\* \* \* \* \*